(12) United States Patent
Kawashima et al.

(10) Patent No.: US 8,259,348 B2
(45) Date of Patent: Sep. 4, 2012

(54) IMAGE PROCESSING APPARATUS AND METHOD, IMAGE OUTPUT APPARATUS, IMAGE PROCESSING SYSTEM, RECORDING MEDIUM IN WHICH IMAGE PROCESSING PROGRAM IS STORED, AND RECORDING MEDIUM IN WHICH IMAGE OUTPUT PROGRAM IS STORED

(75) Inventors: Hidetoshi Kawashima, Kanagawa (JP); Akihiro Ito, Kanagawa (JP); Yuichi Nishikuni, Kanagawa (JP); Toshio Koriyama, Kanagawa (JP); Toshie Kobiyama, Saitama (JP)

(73) Assignee: Fuji Xerox Co. Ltd., Tokyo (JP)

( * ) Notice: Subject to any disclaimer, the term of this patent is extended or adjusted under 35 U.S.C. 154(b) by 286 days.

(21) Appl. No.: 12/043,991

(22) Filed: Mar. 7, 2008

(65) Prior Publication Data

US 2008/0278736 A1 Nov. 13, 2008

(30) Foreign Application Priority Data

May 11, 2007 (JP) .................................. 2007-126988

(51) Int. Cl.
*H04N 1/60* (2006.01)
*G06F 3/12* (2006.01)
*G03F 3/08* (2006.01)
*G06K 9/00* (2006.01)

(52) U.S. Cl. ......... 358/1.9; 358/1.15; 358/523; 382/167

(58) Field of Classification Search .................... 358/1.9, 358/1.1, 3.23, 3.27, 1.16, 523, 539, 540; 382/162, 165, 167

See application file for complete search history.

(56) References Cited

U.S. PATENT DOCUMENTS

| | | | |
|---|---|---|---|
| 6,226,011 B1 * | 5/2001 | Sakuyama et al. | 345/600 |
| 6,324,975 B1 * | 12/2001 | Kondo | 101/171 |
| 6,480,299 B1 * | 11/2002 | Drakopoulos et al. | 358/1.9 |
| 7,199,900 B2 * | 4/2007 | Ogatsu et al. | 358/1.9 |
| 7,495,797 B2 * | 2/2009 | Okamoto | 358/1.9 |
| 7,515,304 B2 * | 4/2009 | Ito et al. | 358/3.23 |
| 7,626,728 B2 * | 12/2009 | Itagaki et al. | 358/1.9 |
| 7,692,831 B2 * | 4/2010 | Nishikawa | 358/518 |
| 7,751,085 B2 * | 7/2010 | Yabe | 358/1.9 |

(Continued)

FOREIGN PATENT DOCUMENTS

JP 7107312 A 4/1995

(Continued)

OTHER PUBLICATIONS

Japanese Office Action corresponding to Japanese Patent Application No. 2007-126988 dated Dec. 20, 2012.

*Primary Examiner* — Madelein A Nguyen
(74) *Attorney, Agent, or Firm* — Sughrue Mion, PLLC

(57) ABSTRACT

An image processing apparatus includes a first print information receiving unit for receiving first print information including image data and color information, a color conversion parameter generating unit that generates a color conversion parameter for converting a color signal of the image data to a color signal of a color space fixed in advance, based on the color information included in the first print information, and a second print information transmitting unit that generates second print information by adding the color conversion parameter to the first print information. Also disclosed is an image processing method.

18 Claims, 17 Drawing Sheets

U.S. PATENT DOCUMENTS

| | | | |
|---|---|---|---|
| 7,859,729 B2* | 12/2010 | Ido | 358/518 |
| 2002/0159083 A1* | 10/2002 | Arai et al. | 358/1.9 |
| 2003/0164968 A1* | 9/2003 | Iida | 358/1.9 |
| 2004/0004731 A1* | 1/2004 | Itagaki | 358/1.9 |
| 2004/0136016 A1 | 7/2004 | Oshikawa et al. | |
| 2005/0019077 A1* | 1/2005 | Hatta et al. | 400/62 |
| 2005/0036157 A1* | 2/2005 | Takabayashi et al. | 358/1.9 |
| 2006/0007457 A1* | 1/2006 | Namikata | 358/1.9 |
| 2006/0023239 A1* | 2/2006 | Ferlitsch | 358/1.13 |
| 2006/0056683 A1* | 3/2006 | Komatsu | 382/162 |
| 2006/0066882 A1* | 3/2006 | Yamauchi et al. | 358/1.9 |
| 2006/0092445 A1 | 5/2006 | Muramatsu | |
| 2006/0139668 A1* | 6/2006 | Nishikawa | 358/1.9 |
| 2007/0279656 A1* | 12/2007 | Yamauchi et al. | 358/1.9 |
| 2007/0279658 A1* | 12/2007 | Ito et al. | 358/1.9 |
| 2007/0279714 A1* | 12/2007 | Higashikata et al. | 358/518 |
| 2008/0246982 A1* | 10/2008 | Kaneko et al. | 358/1.9 |
| 2008/0252915 A1* | 10/2008 | Jun | 358/1.9 |
| 2008/0259371 A1* | 10/2008 | Ito et al. | 358/1.9 |
| 2009/0060322 A1* | 3/2009 | Stevens | 382/162 |
| 2009/0180127 A1* | 7/2009 | Yabe | 358/1.9 |
| 2009/0228955 A1* | 9/2009 | Gibson et al. | 726/1 |

FOREIGN PATENT DOCUMENTS

| | | |
|---|---|---|
| JP | 2000175063 A | 6/2000 |
| JP | 2003143388 A | 5/2003 |
| JP | 2004046339 A | 2/2004 |
| JP | 2004-171050 A | 6/2004 |
| JP | 2004230726 A | 8/2004 |
| JP | 2005142844 A | 6/2005 |
| JP | 2006093780 A | 4/2006 |
| JP | 2006-135546 A | 5/2006 |
| JP | 2006345097 A | 12/2006 |

\* cited by examiner

FIG. 6

| COLOR INFORMATION | | DETERMINATION |
|---|---|---|
| INPUT COLOR SPACE | COLOR CONVERSION PROFILE | |
| RGB | ABSENT | No (NOT GENERATE COLOR CONVERSION PARAMETER) |
| RGB | PRESENT | Yes (GENERATE COLOR CONVERSION PARAMETER) |
| CMYK | ABSENT | No |
| CMYK | PRESENT | Yes |
| N-Channel | ABSENT | No |
| N-Channel | PRESENT | Yes |

FIG. 11

| COLOR/IMAGE INFORMATION | | | COLOR PROFILE SPECIFICATION WHEN GENERATING COLOR CONVERSION PARAMETER | |
|---|---|---|---|---|
| INPUT COLOR SPACE | ATTACHED PROFILE | TRANSMISSION PROCESSING INSTRUCTION | INPUT-SIDE COLOR PROFILE | OUTPUT-SIDE COLOR PROFILE |
| RGB | ABSENT | ABSENT/PRESENT | NOT GENERATE | NOT GENERATE |
| | PRESENT | ABSENT | ATTACHED PROFILE | OUTPUT COLOR PROFILE |
| | | PRESENT | ATTACHED PROFILE | TRANSMISSION PROCESSING-SPECIFIED COLOR PROFILE |
| CMYK N-Channnel | ABSENT | ABSENT | NOT GENERATE | NOT GENERATE |
| | | PRESENT | INPUT DEFAULT COLOR PROFILE | TRANSMISSION PROCESSING-SPECIFIED COLOR PROFILE |
| | PRESENT | ABSENT | ATTACHED PROFILE | OUTPUT COLOR PROFILE |
| | | PRESENT | ATTACHED PROFILE | TRANSMISSION PROCESSING-SPECIFIED COLOR PROFILE |

FIG. 16

| COLOR INFORMATION | | COLOR PROFILE SPECIFICATION WHEN GENERATING COLOR CONVERSION PARAMETER | |
|---|---|---|---|
| INPUT COLOR SPACE | ATTACHED PROFILE | INPUT-SIDE COLOR PROFILE | OUTPUT-SIDE COLOR PROFILE |
| RGB | ABSENT | NOT GENERATE | NOT GENERATE |
| RGB | PRESENT | ATTACHED PROFILE | sRGB PROFILE |
| CMYK N-Channel | ABSENT | STANDARD PROFILE | sRGB PROFILE |
| CMYK N-Channel | PRESENT | ATTACHED PROFILE | sRGB PROFILE |

IMAGE PROCESSING APPARATUS AND METHOD, IMAGE OUTPUT APPARATUS, IMAGE PROCESSING SYSTEM, RECORDING MEDIUM IN WHICH IMAGE PROCESSING PROGRAM IS STORED, AND RECORDING MEDIUM IN WHICH IMAGE OUTPUT PROGRAM IS STORED

CROSS-REFERENCE TO RELATED APPLICATION

This application claims priority under 35 USC 119 from Japanese Patent Application No. 2007-126988 filed May 11, 2007.

BACKGROUND

1. Technical Field

The present invention relates to an image processing apparatus and method, an image output apparatus, an image processing system, a recording medium in which an image processing program is stored, and a recording medium in which an image output program is stored.

2. Related Art

Conventionally, a technique has be carried out in which image data subjected to image processing by an image processing apparatus (host computer) is transmitted to an image output apparatus (device) such as a printer, where an image based on the image data is formed on a recording medium and outputted. In this case, there are differences between the color gamut of the image data subjected to the image processing in the image processing apparatus and the color gamut that can be outputted in the image output apparatus. The color gamuts also differ depending on the type and model of the apparatus and the like. Thus, when the color gamut differs, the colors of the reproduced images will differ between the two apparatuses, and thus, color gamut conversion is carried out (also referred to as gamut mapping) that converts the color gamut of the image data processed in the image processing apparatus to colors in the color gamut of the image output apparatus. Further, there has been known a technique in which in order to improve throughput of the image processing including the color conversion, the image processing to the image data is shared by the image processing apparatus and the image output apparatus in accordance with the respective capabilities thereof.

When color gamut conversion of image data is performed in the image processing apparatus, the throughput (processing speed) may decrease as compared with a case where color gamut conversion is performed in the image output apparatus. On the other hand, when the color gamut conversion of the image data is performed in the image output apparatus, precision may decrease as compared with the case where the color gamut conversion is performed in the image processing apparatus.

Moreover, when the image data per se is exchanged over a network, load is put on the network, thereby making the overall processing time slower.

SUMMARY

One aspect of the present invention provides an image processing apparatus including: a first print information receiving unit for receiving first print information including image data and color information related to colors of the image data; a color conversion parameter generating unit that generates a color conversion parameter for converting, based on the color information included in the first print information received in the first print information receiving unit, a color signal of the image data to a color signal of a color space fixed in advance; and a second print information transmitting unit that generates second print information, by adding the color conversion parameter generated by the color conversion parameter generating unit to the first print information, and transmits the second print information to an image output apparatus for printing an image based on the image data on a recording medium.

BRIEF DESCRIPTION OF THE DRAWINGS

Exemplary embodiments of the present invention will be described in detail based on the following figures, in which:

FIG. 6 is an explanatory diagram for explaining an example of relations between color information and the determination as to whether or not to generate a color conversion parameter according to a first exemplary embodiment of the invention;

FIG. 11 is an explanatory diagram showing combinations of color information of input image data and color profile specification when generating a color conversion parameter according to a second exemplary embodiment of the invention;

FIG. 16 is an explanatory diagram showing combinations of color information of input image data and color profile specification when generating a color conversion parameter according to a third exemplary embodiment of the invention.

DETAILED DESCRIPTION

First Exemplary Embodiment

Hereinafter, exemplary embodiments of the present invention will be described with reference to the drawings.

Figure 1:
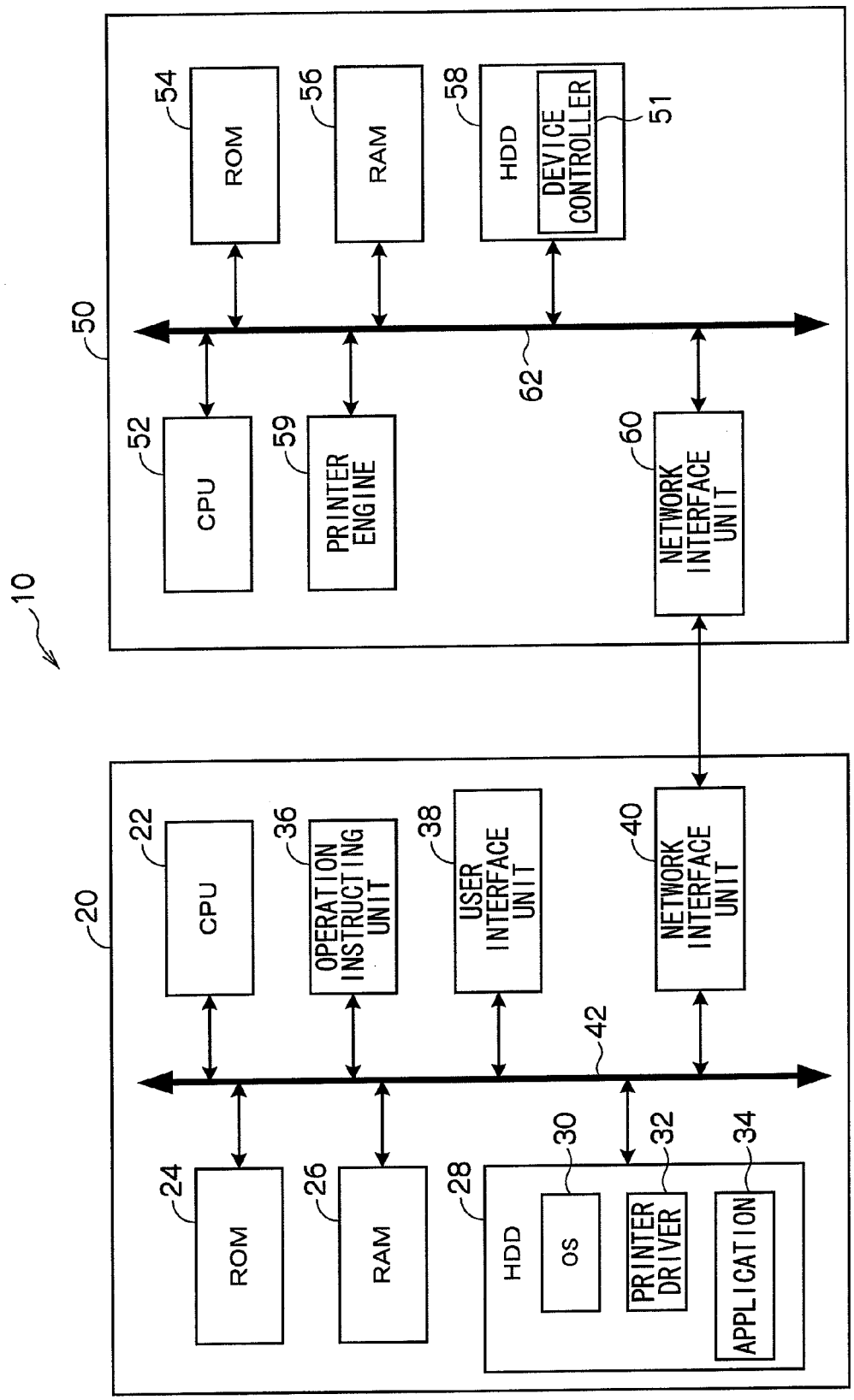
FIG. 1 is a block diagram showing a schematic configuration of an image processing system including an image processing apparatus and an image output apparatus according to a first exemplary embodiment of the present invention.

FIG. 1 is a block diagram showing a schematic configuration of an image processing system 10 including an image processing apparatus 20 and an image output apparatus 50 according to an exemplary embodiment of the present invention.

The image processing apparatus 20 includes a CPU 22, a ROM 24, a RAM 26, an HDD 28, an operation instructing unit 36, a user interface unit 38, and a network interface 40.

The CPU 22 controls the whole of the image processing apparatus 20. Also, in the CPU 22, respective types of processing (details will be described later) of an OS (operating system) 30, a printer driver 32 and an application 34 are read and executed. The OS 30, the printer driver 32, and the application 34 may be recorded on a recording medium such as a CD-ROM (illustration is omitted) and a DVD-ROM (illustration is omitted), and installed in the HDD 28 or the like to be read and executed by the CPU 22. In the HDD 28, the OS 30, the printer driver 32, the application 34 for generating image data are stored. Moreover, output color profile information (details will be described later) of the image output apparatus 50 and the like are stored in advance.

The operation instructing unit 36 performs operation instruction regarding the image processing and the like, for example, by an operation of a user. The user interface unit 38 informs the user of information of image processing and the like, and for example, is a liquid crystal display or the like. The network interface unit 40 is a network interface for communicating image data the image processing and the image output of which are instructed by the user or the like.

The CPU 22, ROM 24, RAM 26, HDD 28, operation instructing unit 36, user interface unit 38, and network interface unit 40 are connected such that mutual exchange of information and the like is possible through a bus 42 such as a control bus and a data bus.

The image output apparatus 50 includes a CPU 52, a ROM 54, a RAM 56, an HDD 58, a printer engine 59, and a network interface unit 60.

The CPU 52 controls the whole of the image output apparatus 50. In the CPU 52, processing of a device controller 51 (details will be described later) is read and executed. In the HDD 58, the device controller 51 that controls the operation of the printer engine 59 is stored. A standard CLUT parameter (details will be described later) is also stored in advance.

The printer engine 59 forms an image on a recording medium based on image data the print instruction of which is made by an instruction of the device controller 51 and outputs the same.

For the image output apparatus 50, an electrophotographic printer may be used as a specific example in the exemplary embodiment. A color image is formed on the recording medium using toner or ink of C (cyan) color, M (magenta) color, Y (yellow) color, and K (black) color.

The CPU 52, ROM 54, RAM 56, HDD 58, printer engine 59, and network interface unit 60 are connected so that information and the like can be mutually supplied and received through a bus 62 such as a control bus and a data bus.

The network interface unit 40 of the image processing apparatus 20, and the network interface 60 of the image output apparatus 50 are connected so that print data (details will be described later) can be supplied and received.

Figure 2:
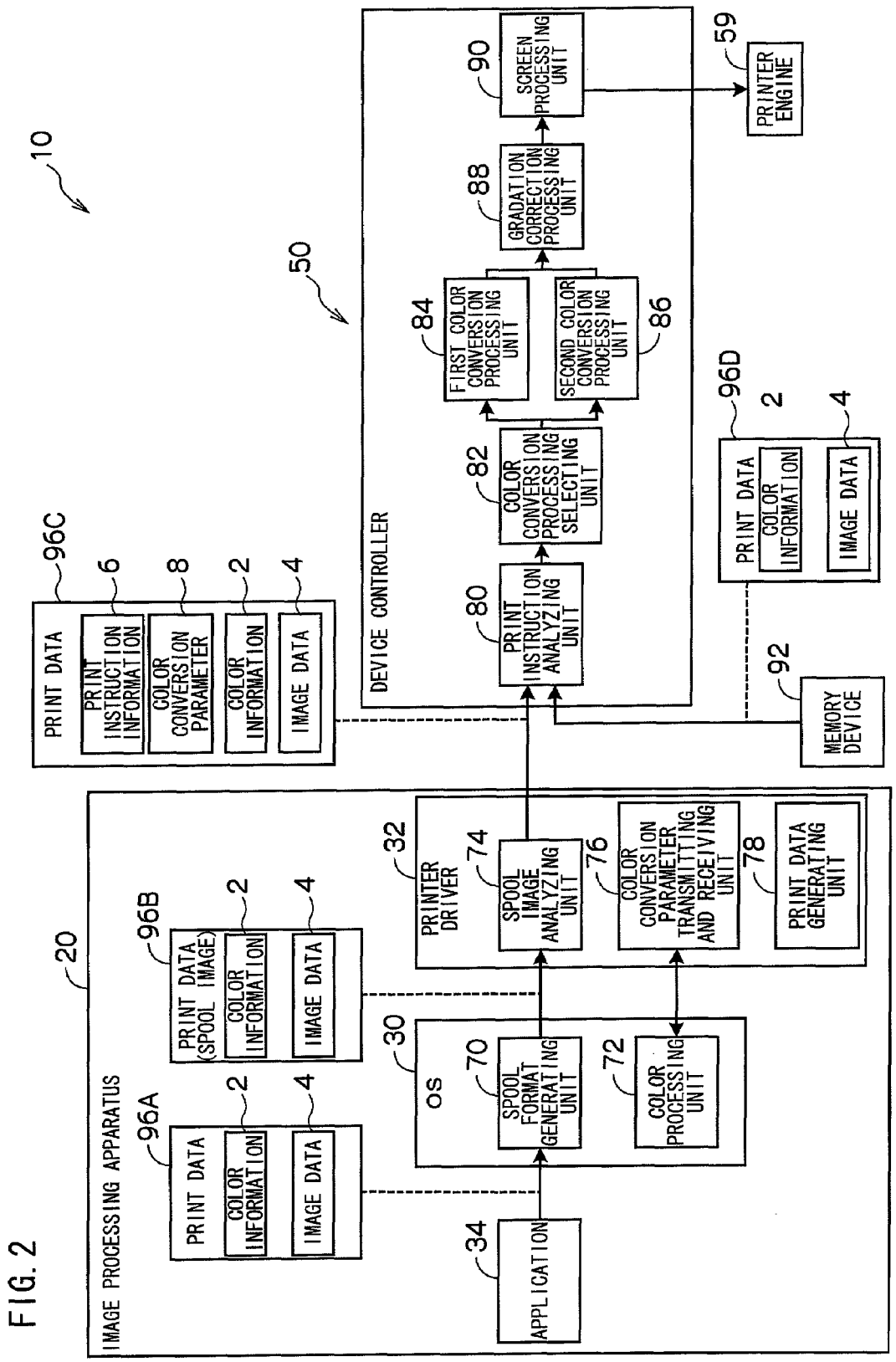
FIG. 2 is a functional block diagram showing a schematic configuration of the image processing apparatus and the image output apparatus (device controller) according to a first exemplary embodiment of the invention.

Next, referring to FIG. 2, image processing in the image processing apparatus 20 and the device controller 51 is described in detail. FIG. 2 is a functional block diagram showing a schematic configuration of the image processing apparatus 20 and the image output apparatus 50 (device controller 51) according to the exemplary embodiment.

The image processing apparatus 20 includes the application 34, the OS 30, and the print driver 32. The OS 30 includes a spool format generating unit 70 (first print information receiving unit) and a color processing unit 72 (color conversion parameter generating unit). Print data 96A (first print information) outputted from the application is inputted to the spool format generating unit 70. The print data 96A includes color information 2 and image data 4. The color information 2 is, for example, information of colors of image data including a profile such as an ICC (International Color Consortium) profile, and a device color gamut and the like. In the exemplary embodiment, the print data 96A is in a format unique to the application 34.

The color processing unit 72 generates a color conversion parameter 8 based on color profile information (details will be described later) received by a color conversion parameter transmitting and receiving unit 76 and transmits the same to the color conversion parameter transmitting and receiving unit 76.

The printer driver 32 includes a spool image analyzing unit 74 (second print information transmitting unit, determination unit), the color conversion parameter transmitting and receiving unit 76, and a print data generating unit 78. In the spool image analyzing unit 74 is inputted print data (spool image) 96B generated by the spool format generating unit 70 based on the print data 96A. The print data 96B includes the color information 2 and the image data 4. In the exemplary embodiment, the print data 96B is in a format unique to the OS 30. The spool image analyzing unit 74 analyzes the presence or absence of a color space and a color profile of the image data. Moreover, it analyzes the color information 2 and determines whether or not to generate the color conversion parameter 8 corresponding to the image output apparatus 50.

When the color conversion parameter 8 is to be generated, the color conversion parameter transmitting and receiving unit 76 transmits color profile information (details will be described later) and the like to the color processing unit 72, and receives the color conversion parameter 8 generated in the color processing unit 72. The print data generating unit 78 writes the received color conversion parameter 8 in the print data 96B, and generates print data 96C (second print information). Also, print instruction information 6 of whether or not the color conversion parameter 8 has been written is also written. If the color conversion parameter 8 is not generated (the color conversion parameter transmitting and receiving unit 76 does not execute the transmission and receiving), the image data 96C does not include the color conversion parameter 8.

The device controller 51 includes a print instruction analyzing unit 80 (second print information receiving unit), a color conversion processing selecting unit 82, a first color conversion processing unit 84 (color signal conversion unit), a second color conversion processing unit 86 (color signal conversion unit), a gradation correction processing unit 88, and a screen processing unit 90. The print data 96C generated by the print data generating unit 78 is inputted to the print instruction analyzing unit 80 through the printer driver. The print data 96C includes the color information 2, the image data 4, the print instruction information 6, and the color conversion parameter 8.

The print instruction analyzing unit 80 analyzes the print instruction information 6, and the color conversion processing selecting unit 82 selects either of the first color conversion processing unit 84 and the second color conversion processing unit 86 based on the relevant analysis result. In the first color conversion processing unit 84 and the second color conversion processing unit 86, the color conversion parameter 8 or the color information is taken out of the print data 96C respectively to execute the color gamut conversion (color conversion) of the image data 4 (details will be described later). The image data 4 the color gamut of which has been converted is then subjected to gradation correction by the gradation correction processing unit 88, and subsequently processed by the screen processing unit 90 to be outputted to the printer engine 59.

Moreover, print data 96D is connected to the print instruction analyzing unit 80 through a memory device 92 such as a USB memory, a flash memory and an SD card, for example, so as to be capable of be inputted. The print data 96D includes at least color information 2 and image data 4.

Figure 3:
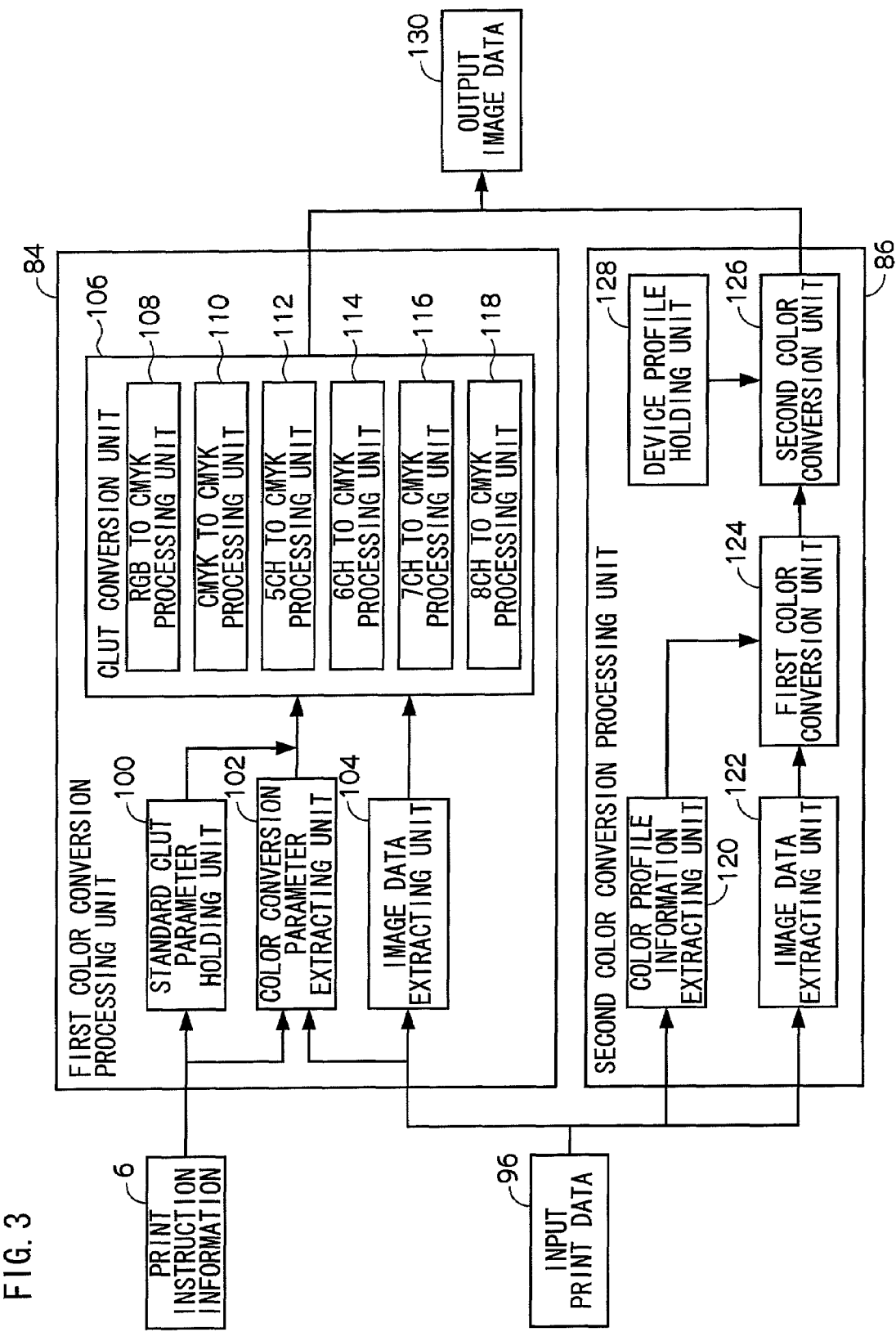
FIG. 3 is a functional block diagram showing a schematic configuration of a first color conversion processing unit and a second color conversion processing unit of the image output apparatus according to a first exemplary embodiment of the invention.

Furthermore, referring to FIG. 3, color gamut conversion (color conversion) in the first color conversion processing unit 84 and the second color conversion processing unit 86 is described in details. FIG. 3 is a functional block diagram showing a schematic function of the first color conversion processing unit 84 and the second color conversion processing unit 86.

The first color conversion processing unit 84 includes a standard CLUT (color look-up table) parameter holding unit 100, a color-conversion parameter extracting unit 102, an image data extracting unit 104, and a CLUT conversion unit 106.

The image data extracting unit 104 extracts the image data 4 from the input print data 96 to output to the CLUT conversion unit 106. If it is determined that the color conversion parameter 8 is absent based on the print instruction information 6, a color conversion parameter in accordance with processing units 108 to 118 (details will be described later) to be used is selected from color conversion parameters held in the standard CLUT parameter holding unit 100 in advance, and is outputted to the CLUT conversion unit 106. If it is determined that the color conversion parameter 8 is present based on the print instruction information 6, the color conversion parameter extracting unit 102 extracts the color conversion parameter 8 to output to the CLUT conversion unit 106.

The CLUT conversion unit 106 includes an RGB to CMYK processing unit 108, a CMYK to CMYK processing unit 110, a 5ch (five colors) to CMYK processing unit 112, a 6ch (six colors) to CMYK processing unit 114, a 7ch (seven colors) to CMYK processing unit 116, and an 8ch (eight colors) to CMYK processing unit 118 as processing units each for converting the color space (color gamut) of the image data 4 from an input device color space (color space of the image processing apparatus 20) to an output device color space (color space of the image output apparatus 50, i.e., CMYK color space in the exemplary embodiment). The CLUT conversion unit 106 sets the inputted color conversion parameter (color conversion parameter 8 or a standard CLUT parameter) in any one of the processing units 108 to 118 selected to match the input device color space, and based on the relevant color conversion parameter, the color gamut conversion processing of the inputted image data 4 is performed and output image data 130 is outputted. The processing units included in the CLUT conversion unit 106 are not limited to these, but another processing unit corresponding to input image data may be included. If the input image data is of 1ch, processing corresponding to 1ch (one color) to CMYK may be included.

The second color conversion processing unit 86 includes a color profile information extracting unit 120, an image data extracting unit 122, a first color conversion unit 124, a second color conversion unit 126, and a device profile holding unit 128.

The image data extracting unit 122 extracts the image data 4 from the input print data 96 to output the first color conversion unit 124.

The color profile information extracting unit 120 extracts the color profile information from the color information 2 of the input print data 96 to output to the first color conversion 124. In the exemplary embodiment, the color profile information is information in which color gamut conversion from the input device color space (RGB color space or the like) included in the color information 2 of the input print data 96 to a device-independent color space that does not depend on a specific device (a uniform color space such as Lab color space, a color space of tristimulus value XYZ color system or the like).

The first color conversion unit 124 converts the color space of the inputted image data 4 from the input device color space to the device-independent color space, based on the inputted color profile information. The second color conversion unit 126 converts the color space of the image data 4 from the device-independent color space to the output device color space (in the exemplary embodiment, the CMYK color space), based on the output color profile information of the image output apparatus 50 held in the device profile holding unit 128, and the output image data 130 is outputted. Processing such as compression of the color gamut may be performed.

Next, respective types of processing executed in the image processing system 10 of the exemplary embodiment are described in detail with reference to FIGS. 4 to 7.

Figure 4:
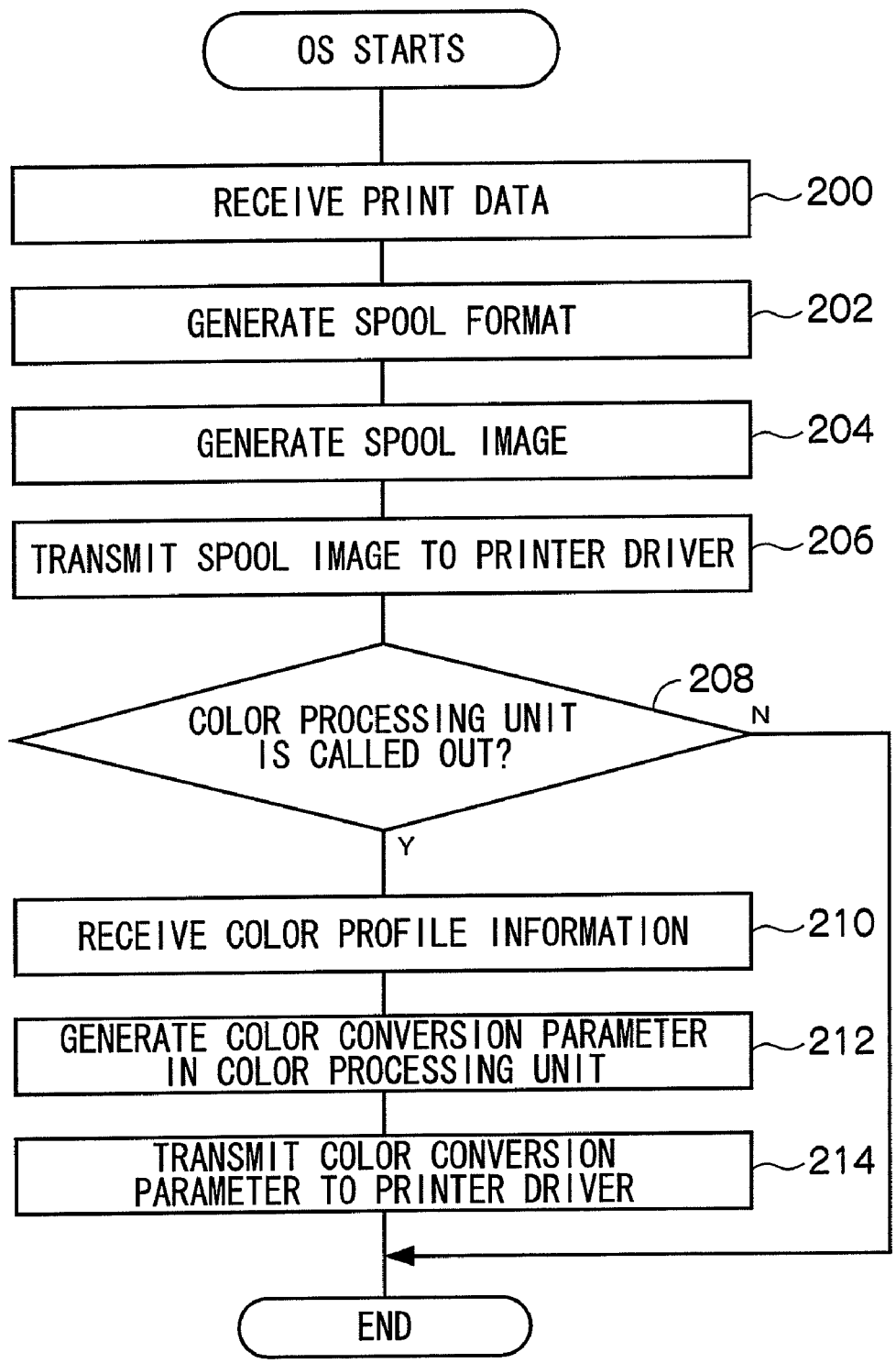
FIG. 4 is a flowchart of processing executed in an OS of the image processing apparatus according to a first exemplary embodiment of the invention.

Referring to FIG. 4, the processing executed in the OS 30 of the image processing apparatus 20 is described in detail. FIG. 4 is a flowchart of the processing executed in the OS 30. The present processing is executed when an image processing instruction is inputted from the operation instructing unit 36 by a user, or when the print data 96A is outputted from the application 34.

In step 200, the print data 96A is received from the application 34. In next step 202, a spool format is generated in the spool format generating unit 70, in step 204, the print data (spool image) 96B is generated, and further in step 206, the spool image 96B is transmitted to the spool image analyzing unit 74 of the printer driver 32.

In next step 208, whether or not the color processing unit 72 is called out is determined. If it is not called out, the determination is negative to end the present processing. On the other hand, if it is called out by the color conversion parameter transmitting and receiving unit 76 of the printer driver 32, the determination is affirmative, so that the processing goes to step 210, in which the color profile information is received from the color conversion parameter transmitting and receiving unit 76. In next step 212, based on the received color profile information, the color conversion parameter 8 is generated in the color processing unit 72, and further in next step 214, the generated color conversion parameter 8 is transmitted to the color conversion parameter transmitting and receiving unit 76 of the printer driver 32, and then the present processing ends.

Through the above-described processing, the OS 30 generates the color conversion parameter 8 based on the received color profile information and transmits the same to the printer driver 32.

Figure 5:
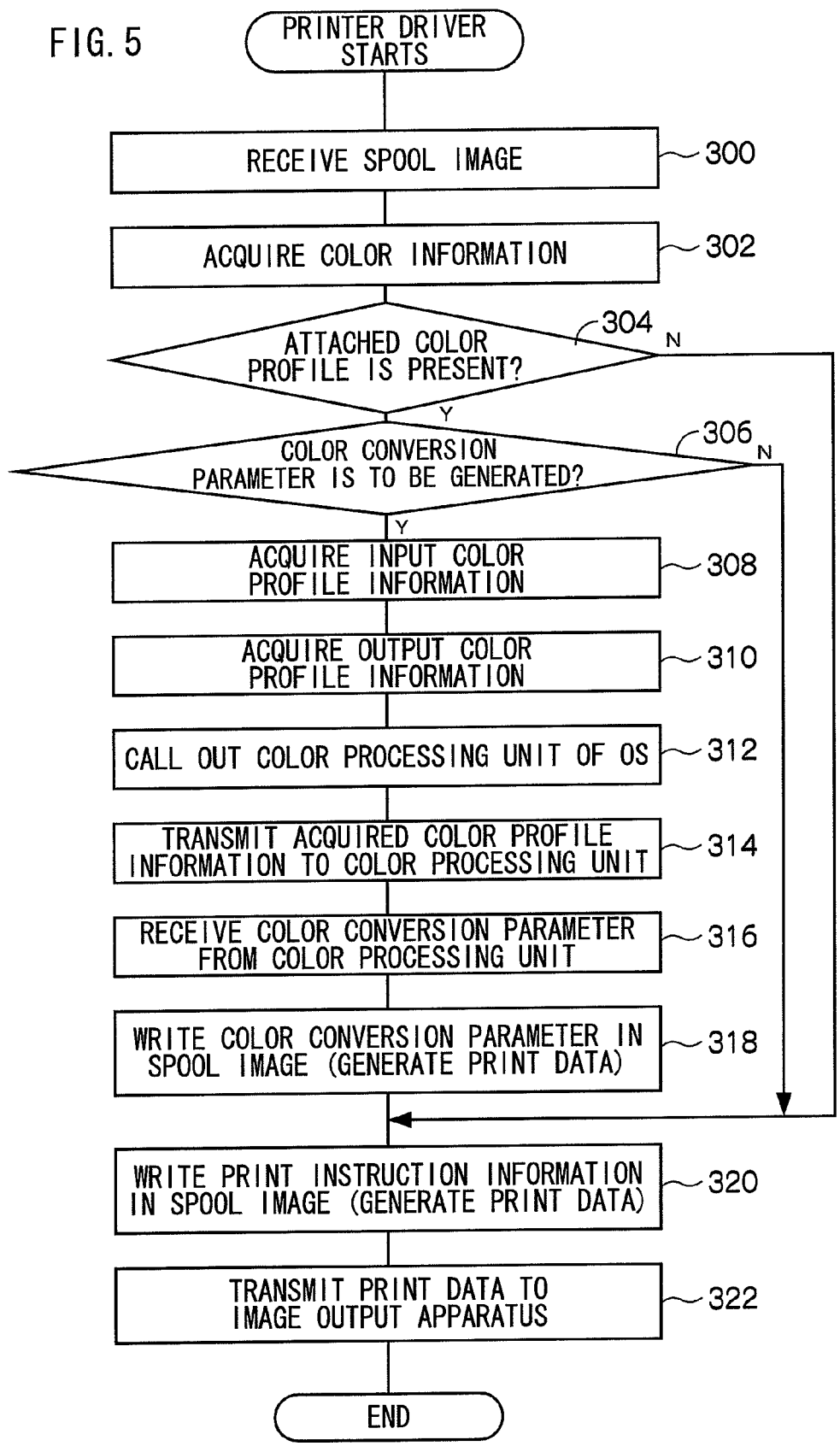
FIG. 5 is a flowchart of processing executed in a printer driver of the image processing apparatus according to a first exemplary embodiment of the invention.

Next, referring to FIG. 5, processing executed in the printer driver 32 of the image processing apparatus 20 is described in detail. FIG. 5 is a flowchart of the processing executed in the printer driver 32. The present processing is executed when an image processing instruction is inputted from the operation instructing unit 36 by the user or when the print data 96B is inputted from the OS 30.

In step 300, the spool image (print data) 96B is received in the spool image analyzing unit 74. In next step 302, the color information 2 included in the print data 96B is acquired. In step 304, it is determined whether or not the color profile (input color profile) information is included in (attached to) the color information 2. If it is not included, the determination is negative, and the processing goes to step 320. On the other hand, if it is included, the determination is affirmative, and the processing goes to step 306.

In step 306, it is determined whether or not to generate the color conversion parameter 8. An example of relations between the color information 2 and the determination as to whether or not to generate the color conversion parameter 8 is shown in FIG. 6. As shown in FIG. 6, in the exemplary embodiment, if no color profile information is included, the color gamut conversion is performed based on the standard CLUT parameter stored in the HDD 58 of the image output apparatus 50 in advance without generating the color conversion parameter. The relations between the color information 2 and the determination as to whether or not to generate the color conversion parameter 8 are not limited to these.

In step 306, if the color conversion parameter is not to be generated, the determination is negative to advance to step 320. On the other hand, if the color conversion parameter is to be generated, the determination is affirmative to advance to step 308.

In step 308, the input color profile information is acquired from the color information 2 of the print data 96B, and in next step 310, the output color profile information is acquired. The output color profile information may be stored in the HDD 28 together when the printer driver 32 is stored in the HDD 28 of the image processing apparatus 20, and in this case, the output color profile information is acquired from the HDD 28. Moreover, the invention is not limited to this, but, for example, the output color profile information may be acquired by reading the same from the device controller 51 each time.

In next step 312, the color processing unit 72 of the OS 30 is called out (which corresponds to step 208 of FIG. 4). In next step 314, the acquired color profile information (input color profile information and output color profile information) is transmitted to the color processing unit 72 by the color conversion parameter transmitting and receiving unit 76 (which corresponds to step 210 of FIG. 4).

In next step 316, the generated color conversion parameter 8 is received from the color processing unit 72 (which corresponds to step 214 of FIG. 4). In step 318, the color conversion parameter 8 is written in the spool image (print data) 96B by the print data generating unit 78 to thereby generate the print data 96C. In step 320, the print instruction information 6 is written in the spool image 96B to thereby the print data 96C. Furthermore, in step 322, the generated print data 96C is outputted to the print instruction analyzing unit 80 of the image output apparatus 50 (device controller 51) and then, the processing ends.

Through the above-describe processing, the printer driver 32 transmits the acquired input color profile information and the output color profile information to the OS 30, and further transmits the color conversion parameter 8 received from the OS 30 to the image output apparatus 50.

Figure 7:
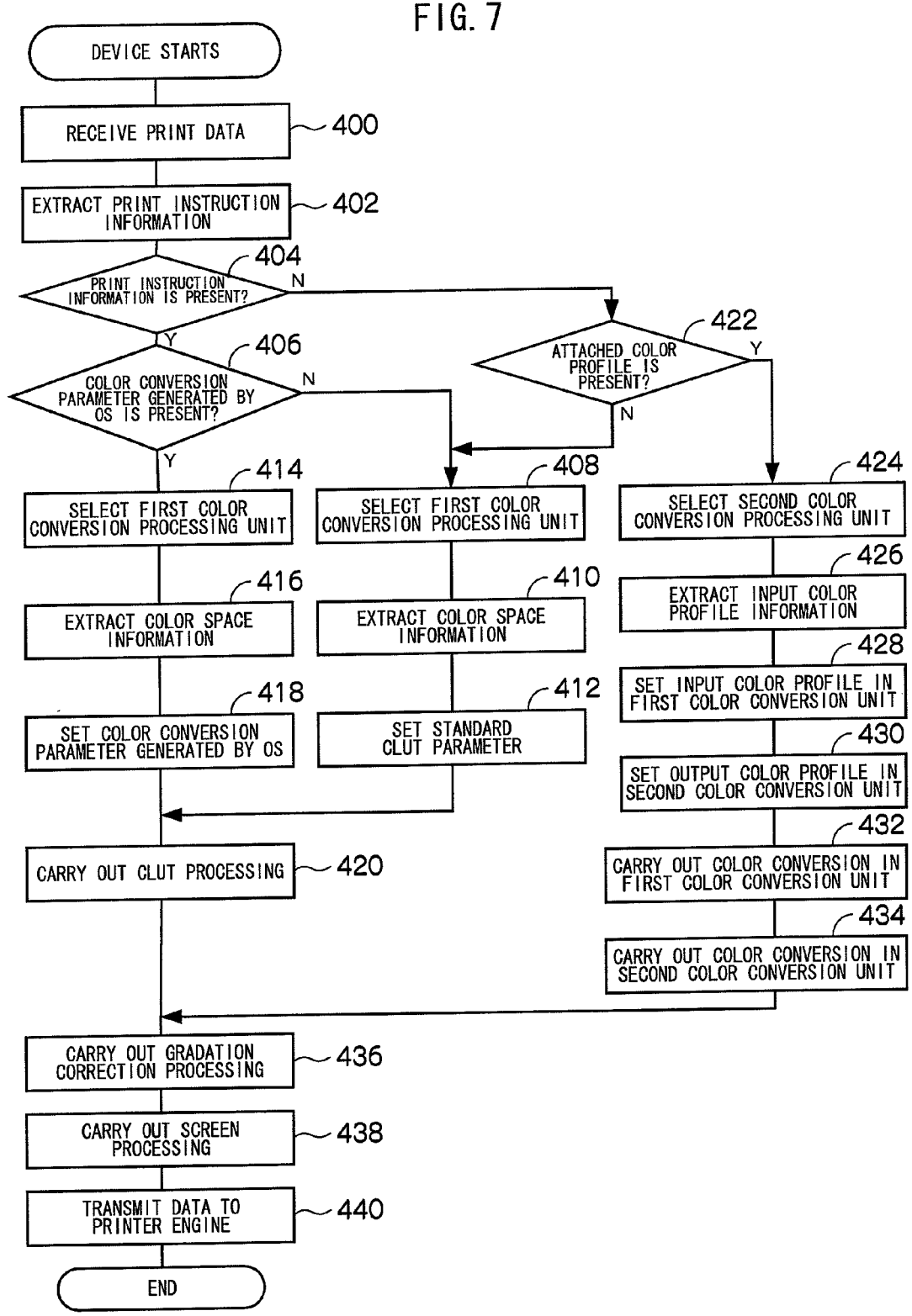
FIG. 7 is a flowchart of processing executed in the device controller of the image output apparatus according to a first exemplary embodiment of the invention.

Next, referring to FIG. 7, processing executed in the device controller 51 of the image output apparatus 50 is described in detail. FIG. 7 is a flowchart of the processing executed in the device controller 51. The present processing is executed when an image processing instruction is inputted from the operation instructing unit 36 by the user, or when the print data 96C outputted from the print driver 32 is received.

In step 400, the print data 96C or the print data 96D is received in the print instruction analyzing unit 80, and in step 402, the print instruction information 6 is extracted from the print data 96C.

In step 404, the presence or absence of the print instruction information 6 is determined. In step 402, if the print instruction information 6 is extracted, the determination is affirmative to advance to step 406. In step 406, the presence or absence of the color conversion parameter 8 generated in the OS 30 is determined. If the color conversion parameter 8 is not included in the print data 96C, the determination is negative to advance to step 408. In step 408, the first color conversion processing unit 84 is selected by the color conversion processing selecting unit 82, and in step 410, the input device color space information is extracted from the color information 2 included in the print data 96C, and in step 412, a color conversion parameter corresponding to the extracted input device color space information is selected from the standard CLUT parameter holding unit 100 to set in the CLUT conversion unit 106. The processing then goes to step 420.

On the other hand, in step 406, if the color conversion parameter 8 is included in the print data 96C, the determination is affirmative, and the processing goes to step 414. In step 414, the first color conversion processing unit 84 is selected by the color conversion processing selecting unit 82, and in step 416, the input device color space information is extracted from the color information 2. In next step 418, the color conversion parameter 8 generated in the OS 30 is set in the CLUT conversion unit 106, and the processing goes to step 420.

In step 420, any one of the processing units 108 to 118 corresponding to the extracted input device color space is selected from the CLUT conversion unit 106, and after the processing of converting the color space (color gamut) is performed based on the set color conversion parameter or the standard CLUT parameter, the processing goes to step 436. For example, when the input device color space is the RGB color space, the color gamut conversion processing of converting to the CMYK color space by the RGB to CMYK processing unit 108 is executed. Thereby, the output image data 130 (CMYK color space value) in which the color space (color gamut) of the image data 4 has been converted to the output device color space (color gamut) is outputted.

On the other hand, in step 404, in the case where the print instruction information 6 cannot be extracted, such as the case where the print instruction information 6 is not included in the print data 96C or the print data 96D and so on, the determination is negative to advance to step 422.

In step 422, it is determined whether or not the color profile information is attached to the print data 96 (print data 96C, 96D). If it is not attached, the determination is negative, and the processing goes to step 408 to perform the above-described processing. On the other hand, if it is attached, the determination is affirmative to advance to step 424.

In step 424, the second color conversion processing unit 86 is selected by the color conversion processing selecting unit 82. In the exemplary embodiment, the second conversion processing unit 86 is selected in a case where the print data 96D including the color profile information is inputted to the image output apparatus 50 without undergoing the image processing apparatus 20, such as, for example, a case where the memory device 92 is directly connected to the image output apparatus 50 to print the image data 4, that is, so-called direction printing.

In step 426, the input color profile information is extracted from the input print data 96 by the color profile information extracting unit 120, and in next step 428, the extracted input color profile is set in the first color conversion unit 124. Furthermore, in step 430, the output color profile held in the device profile holding unit 128 is set in the second color conversion unit 126.

In step 432, in the first color conversion unit 124, the conversion of the color space (color gamut) is carried out. In the first color conversion unit 124, as described above, the color space (color gamut) is converted from the input device color space to the device-independent color space. For example, in the case where the input device color space is the RGB color space and the Lab color space is used as the device-independent color space, the color space is converted from the RGB color space to the Lab color space. This allows the image data 4 whose color space has been converted to the Lab color space (color gamut) to be outputted to the second color conversion unit 126. In step 434, in the second color conversion unit 126, the conversion of the color space (color gamut) is carried out. In the second color conversion unit 126, the color space (color gamut) is converted from the device-independent color space to the output device color space, as described above. For example, in the case where the device-independent color space is the Lab color space, and the output device color space is the CMYK color space, the color gamut conversion that converts from Lab color space to the CMYK color space is carried out. Thereby, the output image data 130 (CMYK color space value) obtained by converting the color space (color gamut) of the image data 4 to the output device color space (color gamut) is outputted.

In next step 436, gradation correction processing is carried out by the gradation correction processing unit 88. In step 440, screen processing is carried out by the screen processing unit 90. The screen processing converts multivalued data to binary data or the like, in which making screen frequency lower (reducing screen lines in number) enables smooth gradation with the number of gradations, which is preferable for the formation of an image or the like, while making the screen frequency higher (increasing screen lines in number) increases the reproducibility of thin lines in intermediate gradation, which may form a high-resolution image. Although in the exemplary embodiment, the gradation correction processing and the screen processing are carried out, the invention is not limited to this, but for example, another processing may be performed.

In step 440, the output image data 130 subjected to the image processing is transmitted to the printer engine 59, and then the present processing ends. Thereby, the printer engine 59 forms an image on the recording medium based on the output image data 130, and the recording medium with the image data formed is outputted from the image output apparatus 50.

Through the above-described processing, if the print instruction information 6 and the color conversion parameter 8 are included in the received print data 96, the device controller 51 converts the color gamut of the image data 4 from the input device color space to the output device color space in the first color conversion processing unit 84, based on the color conversion parameter 8. If the color conversion parameter 8 is not included, it converts the color gamut in the first color conversion processing unit 84 based on the standard CLUT parameter. Furthermore, if the print instruction information 6 is not included, and the color parameter information is attached, the device controller 51 converts the color gamut from the input device color space to the device-independent color space in the first color conversion unit 124 of the second conversion processing unit 86, based on the input profile information, and converts the color gamut from the device-independent color space to the output device color space in the second color conversion unit 126.

Although in the exemplary embodiment, the case where the output device color space of the image output apparatus 50 is the CMYK color space is described, the invention is not limited to this, but a case of another color space may be similarly applied.

As described above, in the exemplary embodiment, since the color conversion parameter 8 for converting the color gamut of the image data 4 from the input device color space to the output device color space (CMYK color space) is generated in the color processing unit 72, and the spool image analyzing unit 74 transmits the print data 96C with the generated color conversion parameter 8 written therein, to the print instruction analyzing unit 80 of the device controller 51, the device controller 51 may convert the image data 4 from the input device color space to the output device color space based on the received color conversion parameter 8. Thereby, only generating the color conversion parameter 8 in the image processing apparatus 20 allows the color gamut of the image data 4 to be converted in the image output apparatus 50, which may bring about high-precision and high-speed processing.

Second Exemplary Embodiment

Hereinafter, referring to the drawings, a second exemplary embodiment of the invention is described in detail. In the second exemplary embodiment, a case where transmission processing (described in detail later) is performed as image image rendering processing in the device controller is described. In the second exemplary embodiment, since the configuration and the processing are similar to those of the first exemplary embodiment, the same reference numerals and signs are given to the same parts, the detailed descriptions of which are omitted.

In an image processing system including an image processing apparatus and an image output apparatus according to the exemplary embodiment, a schematic configuration of the image processing apparatus is similar to that of the image processing apparatus 20 of the first exemplary embodiment, whose detailed description is omitted.

Figure 8:
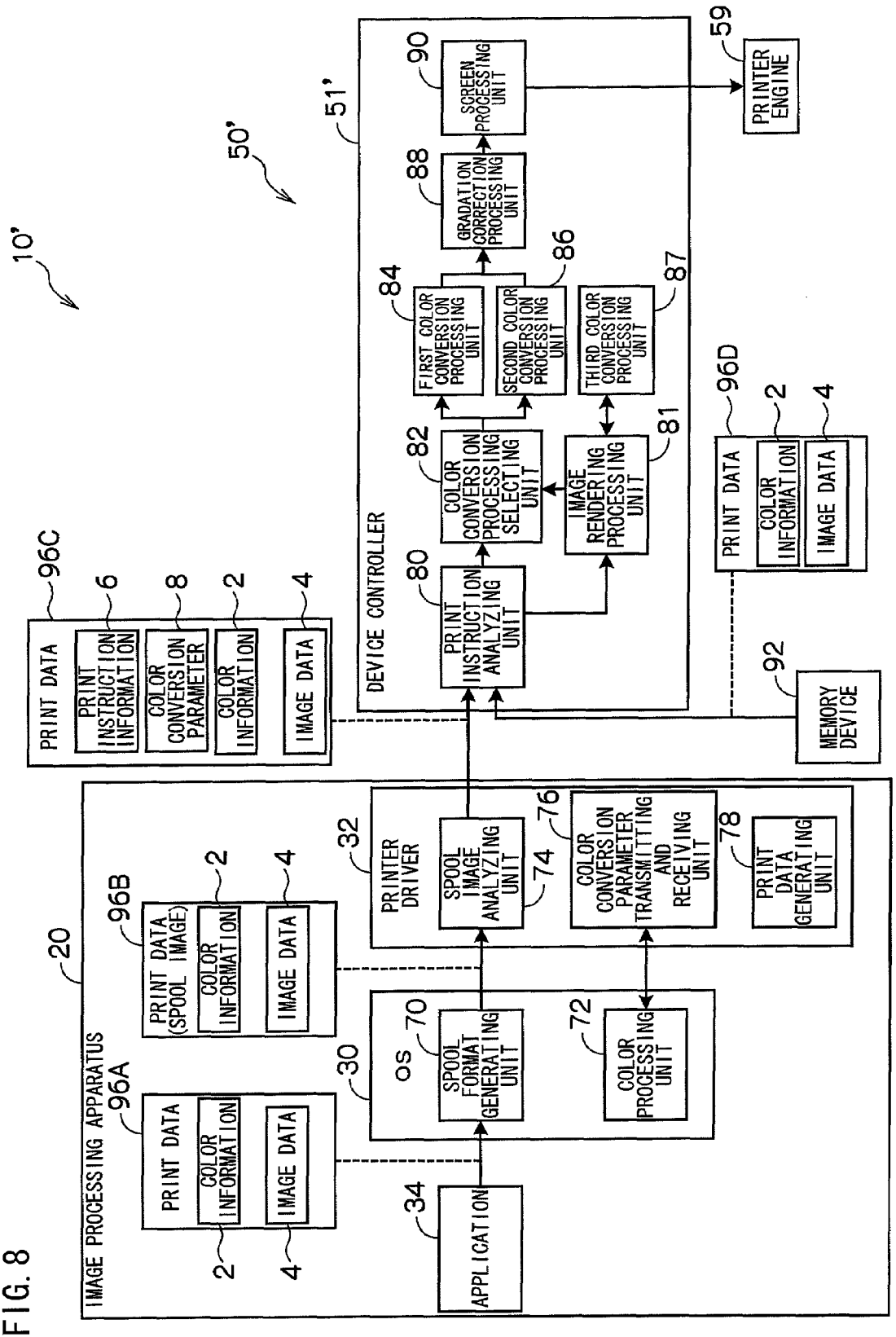
FIG. 8 is a functional block diagram showing a schematic configuration of an image processing apparatus and an image output apparatus (device controller) according to a second exemplary embodiment of the invention.

Referring to FIG. 8, image processing in the image processing apparatus 20 and a device controller 51' is described. FIG. 8 is a functional block diagram showing a schematic configuration of the image processing apparatus 20 and an image output apparatus 50' (device controller 51') according to the second exemplary embodiment.

Figure 9A:
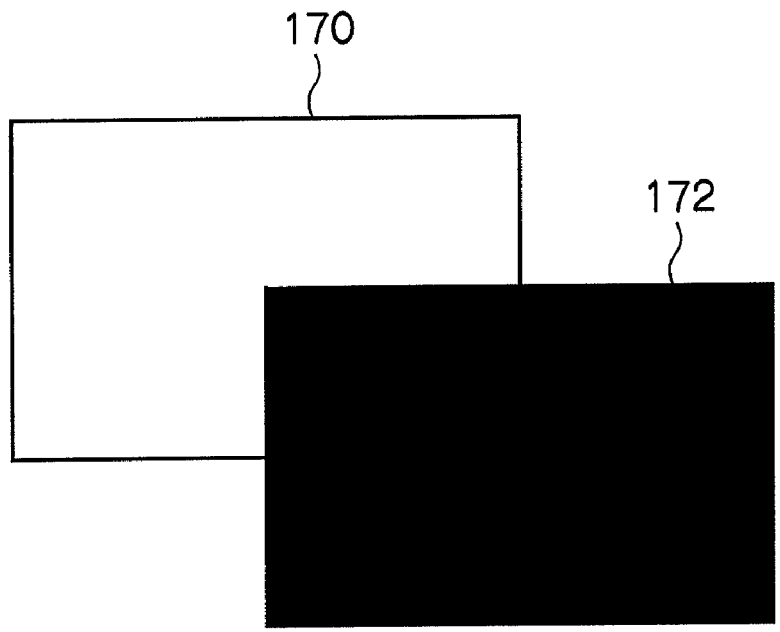
FIGS. 9A and 9B are explanatory diagrams for explaining transmission processing.
Figure 9B:
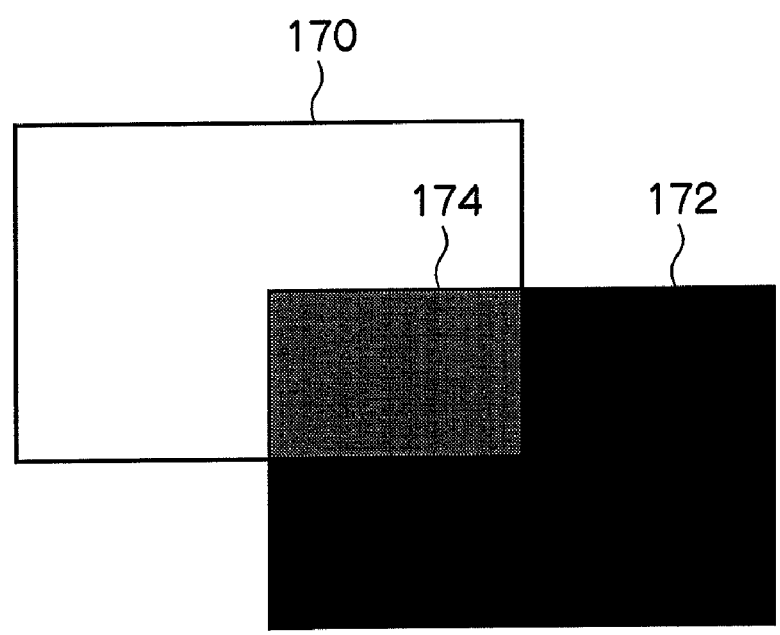

Although the schematic configuration of the image processing apparatus 20 is substantially similar to that of the image processing apparatus 20 of the first exemplary embodiment, in the second exemplary embodiment, the spool image analyzing unit 74 of the printer driver 32 further analyzes the presence or absence of the transmission processing, and the presence or absence of specification of a transmission processing color space, based on the color information 2 of the print data 96B. If the transmission processing is present, the color conversion parameter transmitting and receiving unit 76 transmits the color profile information and transmission processing-specified color profile information to the color processing unit 72 of the OS 30. The transmission processing (blending processing) denotes processing for an overlapping part of images. In FIG. 9A, an image 170 and an image 172 overlap without transmission. On the other hand, in FIG. 9B, the image 170 and the image 172 overlap so that density of both the images becomes half (so that both the images are transmissive). Thus, in an image of a region 174 where both the images overlap, densities of both the images appear blended. In the cases shown in FIG. 9, if the color spaces of the image data of the image 170 and the image data of the image 172 are different, simply blending of the densities of both the images does not suffice, and thus, the color spaces of the image data of the image 170 and the image data of the image 172 are converted to be the same. At this time, the color space resulting from the conversion is a transmission processing-specified color space in the exemplary embodiment, and the information described about the conversion to the image data of the transmission processing-specified color space is the transmission processing-specified color profile information. The transmission processing-specified color profile information is, for example, an sRGB color space profile, an scRGB color space profile and the like. In the exemplary embodiment, as a specification of the OS 30, the sRGB color space or the scRGB color space is specified in advance as the transmission processing-specified color space, and the user or the like can specify which color space is to be used. Thus, while the case where the sRGB color space is specified by the user or the like in advance is described here, the invention is not limited to this.

Moreover, if there is no specified color profile information, a color space profile fixed in advance as a default, for example, the sRGB color space profile is used. The color processing unit 72 generates the color conversion parameter 8 based on the received color profile information. The print data generating unit 78 further writes the information of the presence or absence of the transmission processing in the print instruction information 6 to generate the print data 96C.

On the other hand, the device controller 51' includes the print instruction analyzing unit 80, the color conversion processing selecting unit 82, the first color conversion processing unit 84 (second color signal conversion unit), the second color conversion processing unit 86 (second color signal conversion unit), the gradation correction processing unit 88, the screen processing unit 90, a image image rendering processing unit 81, and a third color conversion processing unit 87 (first color signal conversion unit). The print instruction analyzing unit 80 analyzes the print instruction information 6 of the print data 96C, and if the analysis result shows the transmission processing is absent, the processing is similar to that of the first exemplary embodiment. If the transmission processing is present, the image data 4 is outputted to the image image rendering processing unit 81.

The third color conversion processing unit 87 converts the color space (color gamut) of the image data 4 from the input device color space to the transmission processing-specified color space, based on the color conversion parameter 8. The image image rendering processing unit 81 receives the image data 4 whose color space has been converted to the transmission processing-specified color space, from the third color conversion processing unit 87 to carry out the transmission processing. After the transmission processing is carried out, the image data 4 is further subjected to the color gamut conversion processing of the space color by the color conversion processing unit (the first color conversion processing unit 84 or the second color conversion processing unit 86) selected in the color conversion processing selecting unit 82.

Next, respective types of processing executed in an image processing system 10' of the second exemplary embodiment are described with reference to FIGS. 10 to 12 in detail. Since the processing executed in the OS 30 of the image processing apparatus 20 is substantially similar to that of the first exemplary embodiment, its description is omitted.

Figure 10:
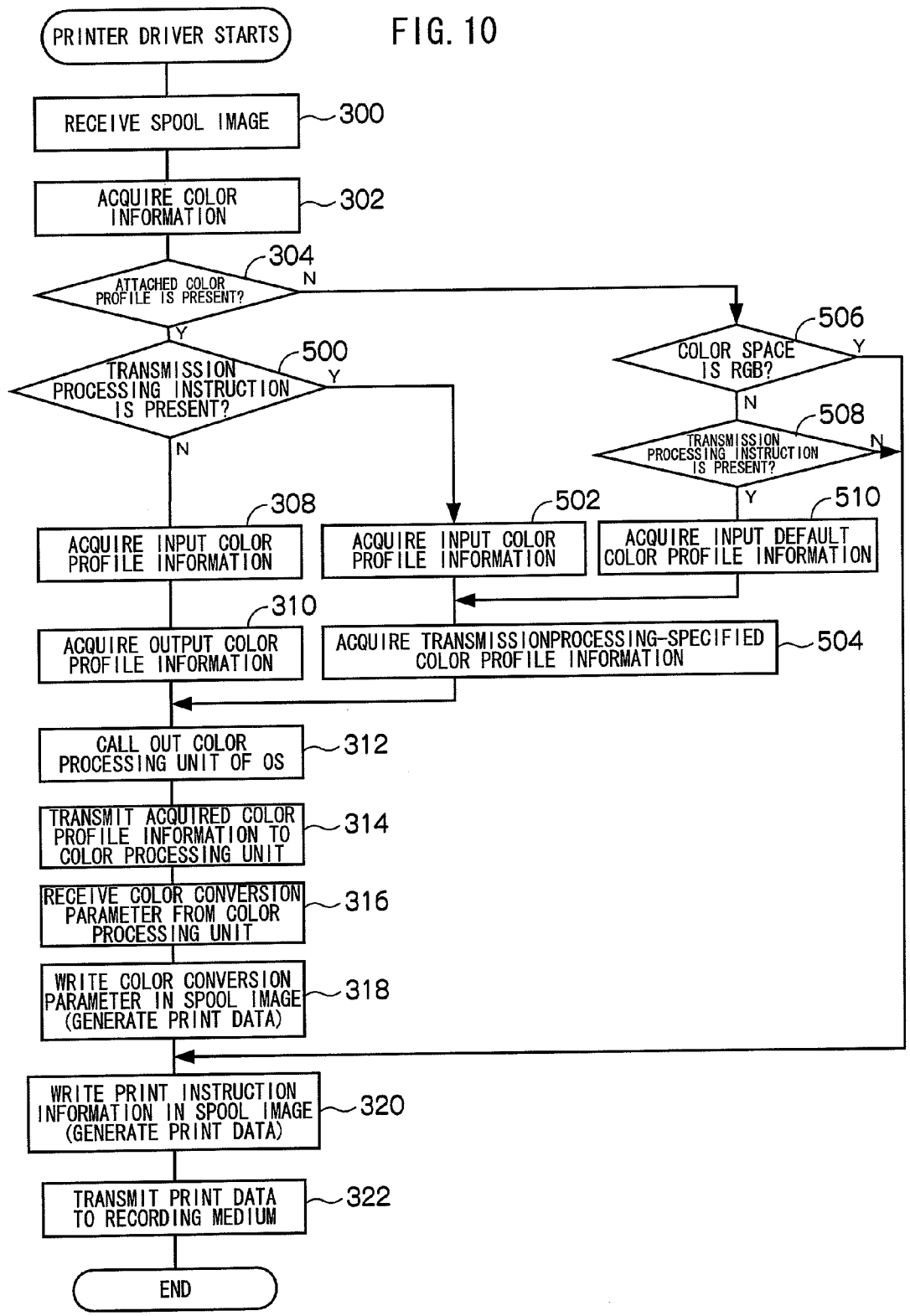
FIG. 10 is a flowchart of processing executed in a printer driver of the image processing apparatus according to a second exemplary embodiment of the invention.

Referring to FIG. 10, the processing executed in the printer driver 32 of the image processing apparatus 20 is described in detail. FIG. 10 is a flowchart of the processing executed in the printer driver 32.

In step 300, the spool image (print data) 96B is received, in step 302, the color information 2 included in the print data 96B is acquired, and further in next step 304, the presence or absence of attached color profile is determined. If the color profile is attached, the determination is affirmative to advance to step 500.

In step 500, whether or not a transmission processing instruction is present is determined. If the transmission processing instruction is absent in the print instruction information 6, the determination is negative to advance to step 308, and after the processing similar to that of the first exemplary embodiment is performed, the present processing ends. On the other hand, if the transmission processing instruction is present, the determination is affirmative to advance to step 502. In step 502, the input color profile information is acquired from the color information 2 of the print data 96B, and in step 504, the transmission processing-specified color profile information is acquired to advance to step 312. After the processing similar to that of the first exemplary embodiment is performed, the present processing ends. In this case, in step 314, the input color profile information and the transmission processing-specified color profile information are transmitted to the color processing unit 72 as the acquired color profile information.

On the other hand, in step 304, if the attached color profile is absent, the determination is negative to advance to step 506. In step 506, it is determined whether or not the color space (color gamut) of the image data 4 is the RGB color space, that is, whether or it has three channels (3ch) or multiple colors of more channels. If it is the RGB color space, the determination is affirmative to advance to step 320, and after the processing similar to that of the first exemplary embodiment is performed, the present processing ends. In the exemplary embodiment, in the case where the color space (color gamut) of the image data 4 is the RGB color space, the color conversion parameter is not generated.

On the other hand, in step 506, if the color space (color gamut) of the image data 4 is not the RGB color space, the determination is negative to advance to step 508. In step 508, it is determined whether or not the transmission processing instruction is present. If the transmission instruction is absent in the print instruction information 6, the determination is negative to advance to step 320, and after the processing similar to that of the first exemplary embodiment is performed, the present processing ends. In the exemplary embodiment, if the transmission processing instruction is absent, the color conversion parameter is not generated.

On the other hand, in step 508, if the transmission processing is present, the determination is affirmative to advance to step 510. In step 510, a default color profile for each number of channels (number of colors) stored in the HDD 28 in advance is acquired as input default color profile information, and the processing goes to step 504. In step 504, the transmission processing-specified color profile information is acquired, and then the processing goes to step 312. After the processing similar to that of the first exemplary embodiment is performed, the present embodiment ends. In this case, in step 314, the input default color profile information and the transmission processing-specified color profile information are transmitted to the color processing unit 72 as the acquired color profile information. Combinations of the color information of the input image data and the color profile specification when generating the color conversion parameter in the exemplary embodiment are as shown in FIG. 11.

Figure 12:
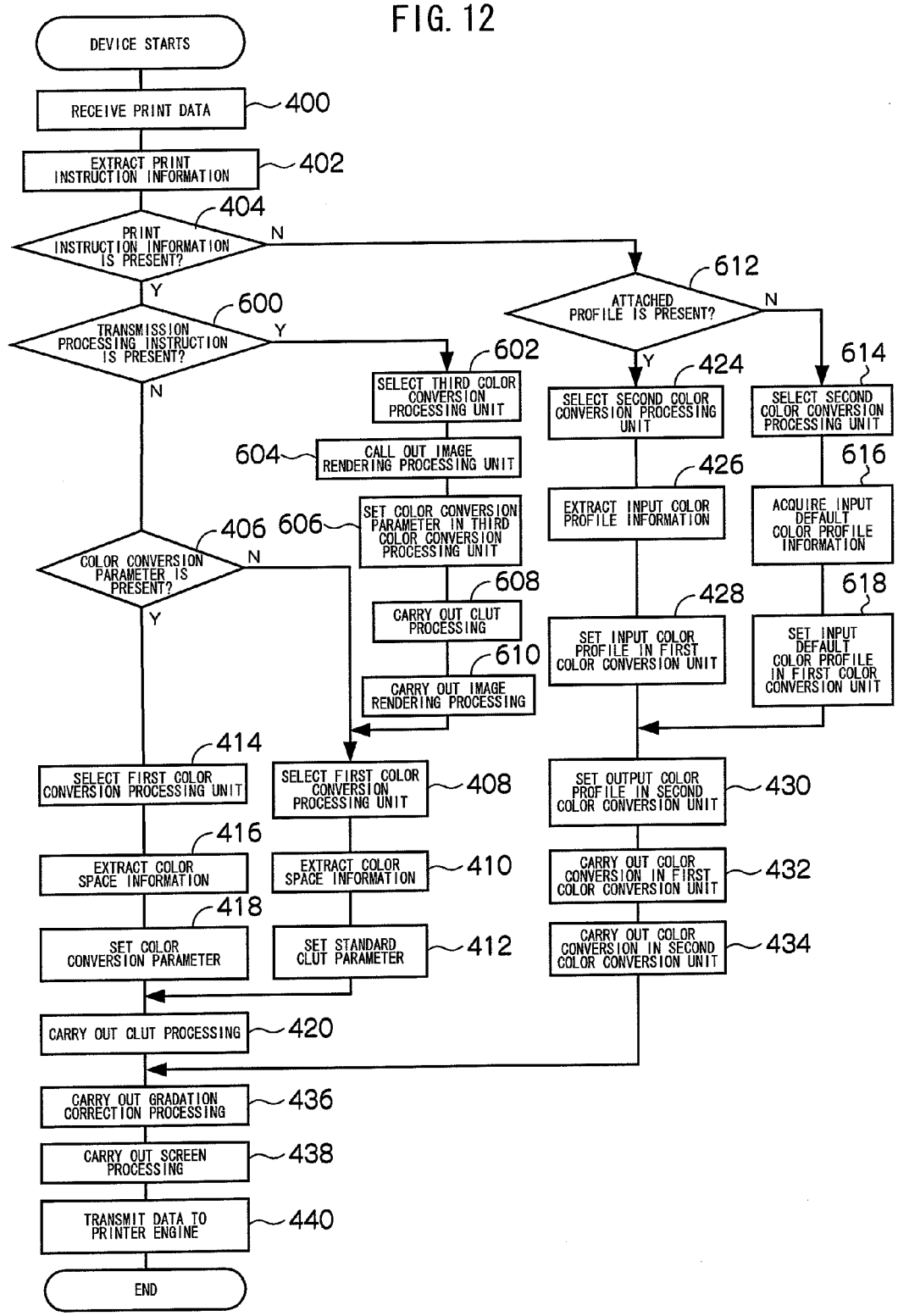
FIG. 12 is a flowchart of processing executed in the device controller of the image output apparatus according to a second exemplary embodiment of the invention.

Next, referring to FIG. 12, processing executed in the device controller 51' of the image output apparatus 50' is described in detail. FIG. 12 is a flowchart of the processing executed in the device controller 51'.

In step 400, the print data 96C is received in the print instruction analyzing unit 80, and in step 402, the print instruction information 6 is extracted from the print data 96C. In next step 404, the presence and absence of the print instruction information 6 is determined.

In step 404, if the print instruction information 6 is present, the determination is affirmative to advance to step 600. In step 600, whether or not a transmission processing instruction is present is determined. If the transmission processing instruction is absent in the print instruction information 6, the determination is negative to advance to step 406, and after the processing similar to that of the first exemplary embodiment is performed, the present processing ends. On the other hand, if the transmission instruction is present, the determination is affirmative to advance to step 602. In step 602, the third color conversion processing unit 87 is selected, in step 604, the image rendering processing unit 81 is called out, and further in next step 606, the color conversion parameter 8 is set in the third color conversion processing unit 87. In next step 608, the CLUT processing is carried out in the third color conversion processing unit 87, and based on the color conversion parameter, the color space (color gamut) of the image data 4 is converted to the transmission processing-specified color space. In step 610, the transmission processing is carried out by the image rendering processing unit 81 as the image rendering processing of the image data 4 subjected to the color gamut conversion to the transmission processing-specified color space, and then, the processing goes to step 408. After for the image data 4 subjected to the transmission processing, the processing similar to that of the first exemplary embodiment is performed, the present processing ends.

On the other hand, in step 404, if the print instruction information 6 is absent in the print data 96C, the determination is negative to advance to step 612. In step 612, whether or not color profile information is attached to the print data 96C is determined. If the attached color profile information is present, the determination is affirmative to advance to step 424, and after the processing similar to that of the first exemplary embodiment is performed, the present processing ends. On the other hand, if there is no attached profile, the determination is negative, and the processing goes to step 614.

In step 614, the color conversion processing selecting unit 82 selects the second color conversion processing unit 86, and in step 616, the color profile information extracting unit 120 extracts the input default color profile information stored in the HDD 28 in advance. In step 618, the extracted input default color profile is set in the first color conversion unit 124, and then the processing goes to step 430. After the processing similar to that of the first exemplary embodiment is performed, the present processing ends.

As described above, in the exemplary embodiment, since the color conversion parameter 8 for converting the color gamut of the image data 4 to the transmission processing-specified color space is generated in the color processing unit 72, and the spool image analyzing unit 74 transmits the print data 96C with the generated color conversion parameter 8 written therein, to the print instruction analyzing unit 80 of the device controller 51', the device controller 51' may convert the color space of the image data 4 from the input device color space to the transmission processing-specified color space based on the received color conversion parameter 8. This allows the image rendering processing unit 81 to perform the transmission processing for the image data 4 of the transmission processing-specified color space. Accordingly, the transmission processing may be performed at high precision.

Third Exemplary Embodiment

Hereinafter, referring to the drawings, a third exemplary embodiment of the invention is described in detail. In the third exemplary embodiment, a case where a color conversion parameter CLUT (color look-up table) for converting the image data from the sRGB color space to the CMYK color space, which is an output device color space of an image output apparatus, is stored in an HDD of the image output apparatus in advance is described. Since the third exemplary embodiment has a configuration and processing substantially similar to those of the first exemplary embodiment and the second exemplary embodiment, the same reference numerals and signs are given to the same parts, whose descriptions are omitted.

In an image processing system including an image processing apparatus and an image output apparatus according to the third exemplary embodiment, a schematic configuration of the image processing apparatus is similar to the image processing apparatus 20 of the first exemplary embodiment, whose description is omitted.

Figure 13:
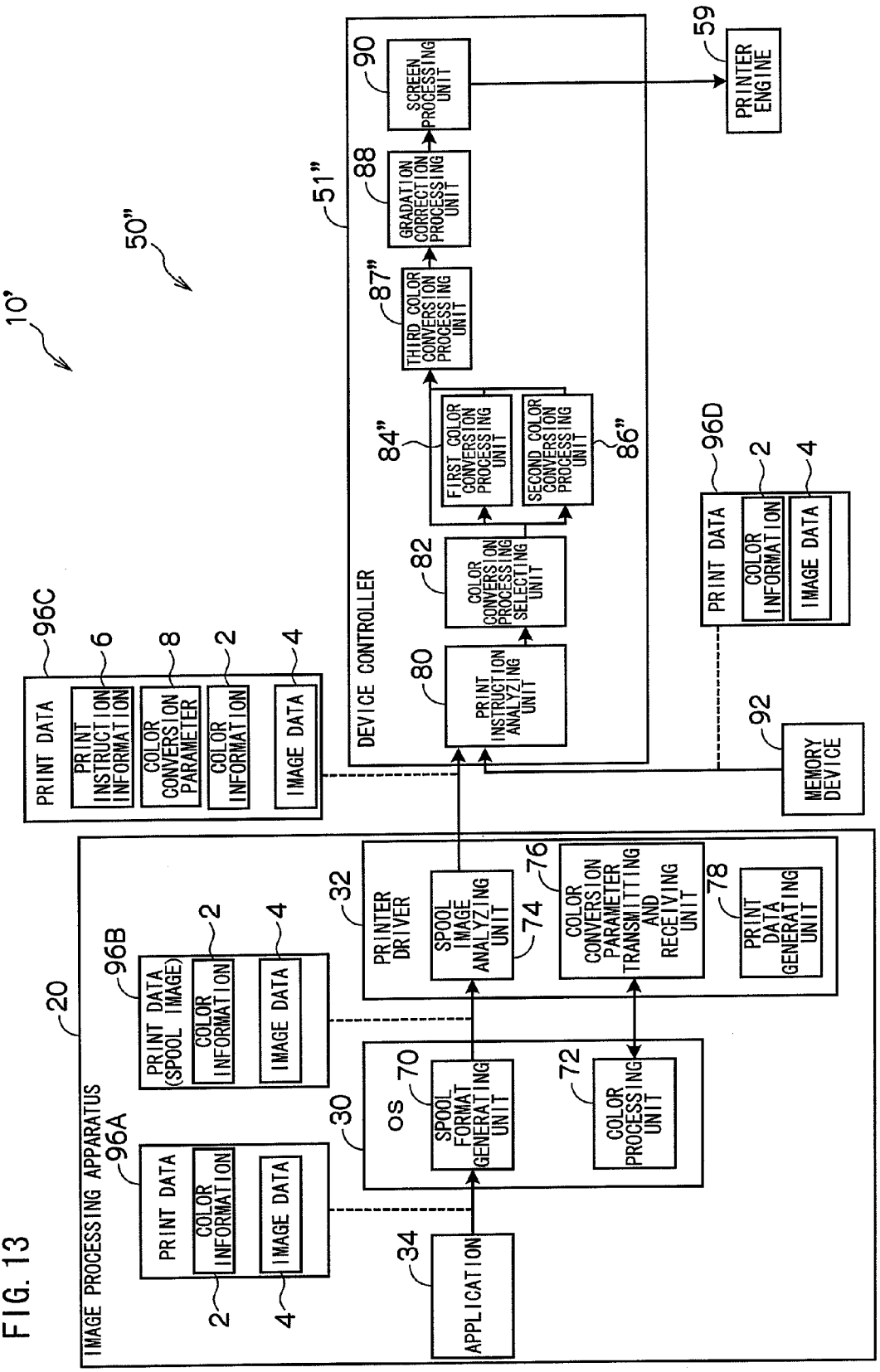
FIG. 13 is a functional block diagram showing a schematic configuration of an image processing apparatus and an image output processing (device controller) according to a third exemplary embodiment of the invention.

Referring to FIG. 13, image processing in the image processing apparatus 20 and a device controller 51" is described. FIG. 13 is a functional block diagram showing a schematic configuration of the image processing apparatus 20 and an image output apparatus 50" (device controller 51") according to the third exemplary embodiment.

Although the schematic configuration of the image processing apparatus 20 is substantially similar to that of the image processing apparatus 20 of the first exemplary embodiment, the color conversion parameter transmitting and receiving unit 76 transmits the color profile information (input color profile information) and sRGB profile information (specific output color profile information corresponding to the input to the image output apparatus 50") to the color processing unit 72 of the OS 30. The color processing unit 72 generates the color conversion parameter 8 based on the received color profile information.

On the other hand, the device controller 51" includes the print instruction analyzing unit 80, the color conversion processing selecting unit 82, a first color conversion processing unit 84" (first color signal conversion unit), a second color conversion processing unit 86" (first color signal conversion unit), the gradation correction processing unit 88, the screen processing unit 90, and a third color conversion processing unit 87" (second color signal conversion unit). The print instruction information 6 of the print data 96C is analyzed in the print instruction analyzing unit 80, and if the attachment of the color conversion parameter 8 is absent, and the color space of the image data 4 is the RGB color space, the image data is processed as the sRGB data, so that the color conversion processing selecting unit 82 selects the third color conversion processing unit 87". The third color conversion processing unit 87" converts the color space (color gamut) of the inputted image data 4 from the sRGB color space to the output device color space (color space matching the characteristics of the printer engine 59, in the exemplary embodiment, the CMYK color space (color gamut)) by the CLUT (color lookup table) stored in the HDD 58 in advance.

Figure 14:
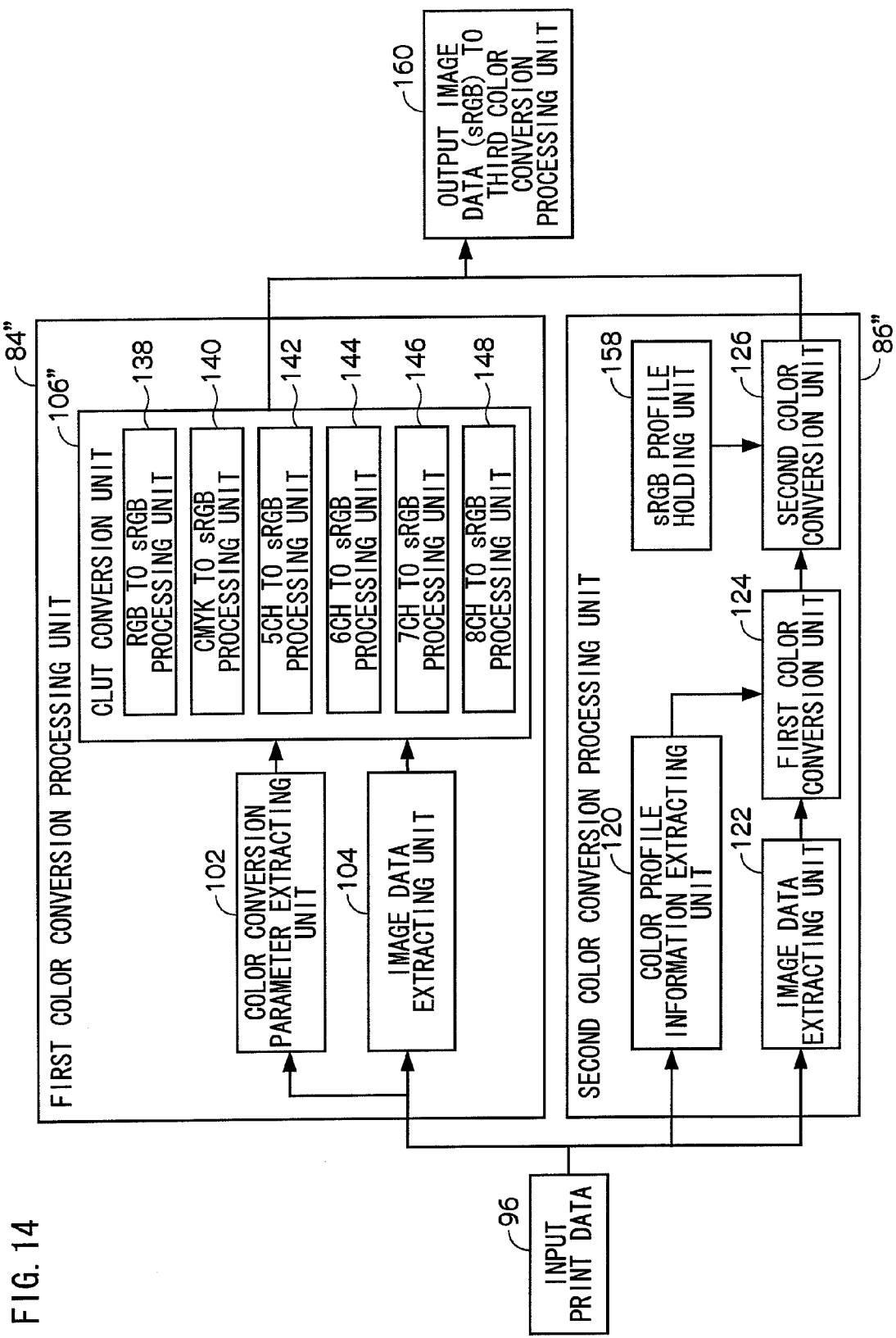
FIG. 14 is a functional block diagram showing a schematic configuration of a first color conversion processing unit and a second color conversion processing unit of the image output apparatus according to a third exemplary embodiment of the invention.

Furthermore, referring to FIG. 14, the color gamut conversion (color conversion) in the first color conversion processing unit 84" and the second color conversion processing unit 86" according to the third exemplary embodiment is described in detail. FIG. 14 is a functional block diagram showing a schematic configuration of the first color conversion processing unit 84" and the second color conversion processing unit 86".

The first color conversion processing unit 84" includes the color conversion parameter extracting unit 102, the image data extracting unit 104, and a CLUT conversion unit 106".

The color conversion parameter extracting unit 102 extracts the color conversion parameter 8 from the input print data 96 and outputs the same to the CLUT conversion part 106".

The CLUT conversion unit 106" includes an RGB to sRGB processing unit 138, a CMYK to sRGB processing unit 140, a 5ch (five colors) to sRGB processing unit 132, a 6ch (six colors) to sRGB processing unit 144, a 7ch (seven colors) to sRGB processing unit 146, and an 8ch (eight colors) to sRGB processing unit 148 as processing units each for converting the color space (color gamut) of the image data 4 from an input device color space (color space of the image processing apparatus 20) to the sRGB color space (specific color space matching the input characteristics of the image output apparatus 50"). The CLUT conversion unit 106" sets the inputted color conversion parameter 8 in any one of the processing units 138 to 148 selected to match the input device color space, and based on the relevant color conversion parameter, the color gamut conversion processing of the inputted image data 4 is performed and output image data 160 (sRGB color space value) is outputted to the third color conversion processing unit 87".

The second color conversion processing unit 86" includes the color profile information extracting unit 120, the image data extracting unit 122, the first color conversion unit 124, the second color conversion unit 126, and an sRGB profile holding unit 158.

The first color conversion unit 124 converts the color space of the inputted image data 4 from the input device color space to the device-independent color space, based on the inputted color profile information. The second color conversion unit 126 converts the color space of the image data 4 from the device-independent color space to the sRGB color space, based on the sRGB profile information, which is color profile information of the specific color space matching the input characteristics of the image output apparatus 50" and held in the sRGB profile holding unit 158, and then the output image data 160 is outputted.

Next, respective types of processing executed in the image processing system 10" of the exemplary embodiment are described in detail with reference to FIGS. 15 to 17. The processing executed in the OS 30 of the image processing apparatus 20 is substantially similar to that of the first exemplary embodiment, whose description is omitted.

Figure 15:
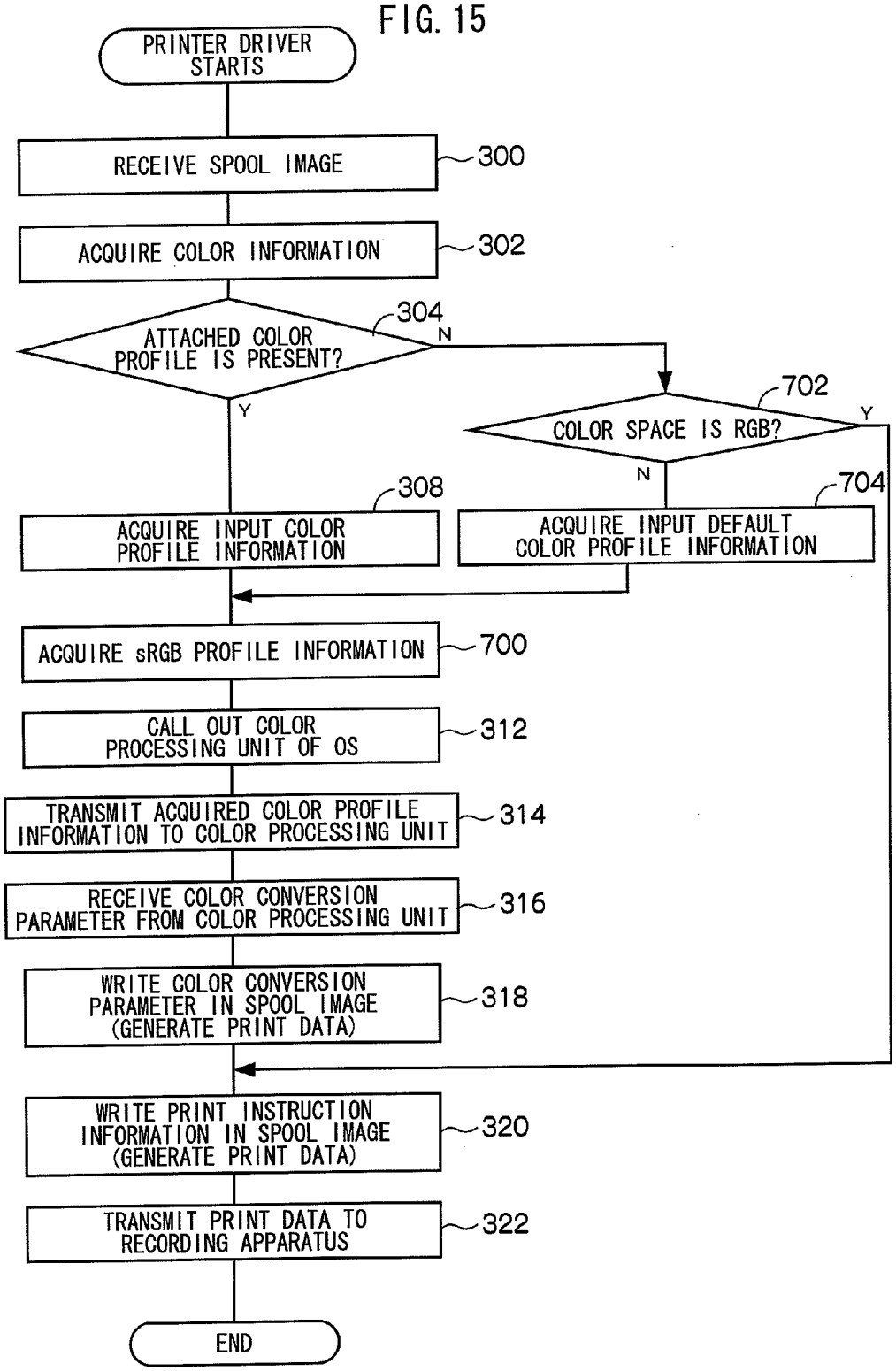
FIG. 15 is a flowchart of processing executed in a printer driver of the image processing apparatus according to a third exemplary embodiment of the invention.

Referring to FIG. 15, the processing executed in the printer driver 32 of the image processing apparatus 20 is described in detail. FIG. 15 is a flowchart of the processing executed in the printer driver 32.

In step 300, the spool image (print data) 96B is received, in step 302, the color information 2 included in the print data 96B is acquired, and further in step 304, the presence or absence of attached color profile is determined. If color profile is attached, the determination is affirmative to advance to step 308, in which the input color profile information is acquired and the processing goes to step 700.

In step 700, the sRGB profile information is acquired as the output color profile information, and the processing goes to step 312. After the processing similar to the first exemplary embodiment is performed, the present processing ends.

On the other hand, in step 304, if there is no attached color profile, the determination is negative to advance to step 702. In step 702, it is determined whether or not the color space (color gamut) of the image data 4 is the RGB color space. If it is the RGB color space, the image data 4 is processed as an sRGB color space value, and thus, if the determination is affirmative, the color conversion parameter is not generated to advance to step 320, and after the processing similar to that of the first exemplary embodiment is performed, the present processing ends. On the other hand, if the color space of the image data 4 is not the RGB color space, the determination is negative to advance to step 704. In step 704, the input default color profile information matching the number of channels of the color space of the image data 4 is acquired from the input default color profile information stored in the HDD 28 in advance, and the processing goes to step 700, in which the sRGB profile information is acquired. The processing further goes to step 312, and after the processing similar to the first exemplary embodiment is performed, the present processing ends. The combinations of color information of the input image data and color profile specification when generating the color conversion parameter in the third exemplary embodiment are as shown in FIG. 16.

Figure 17:
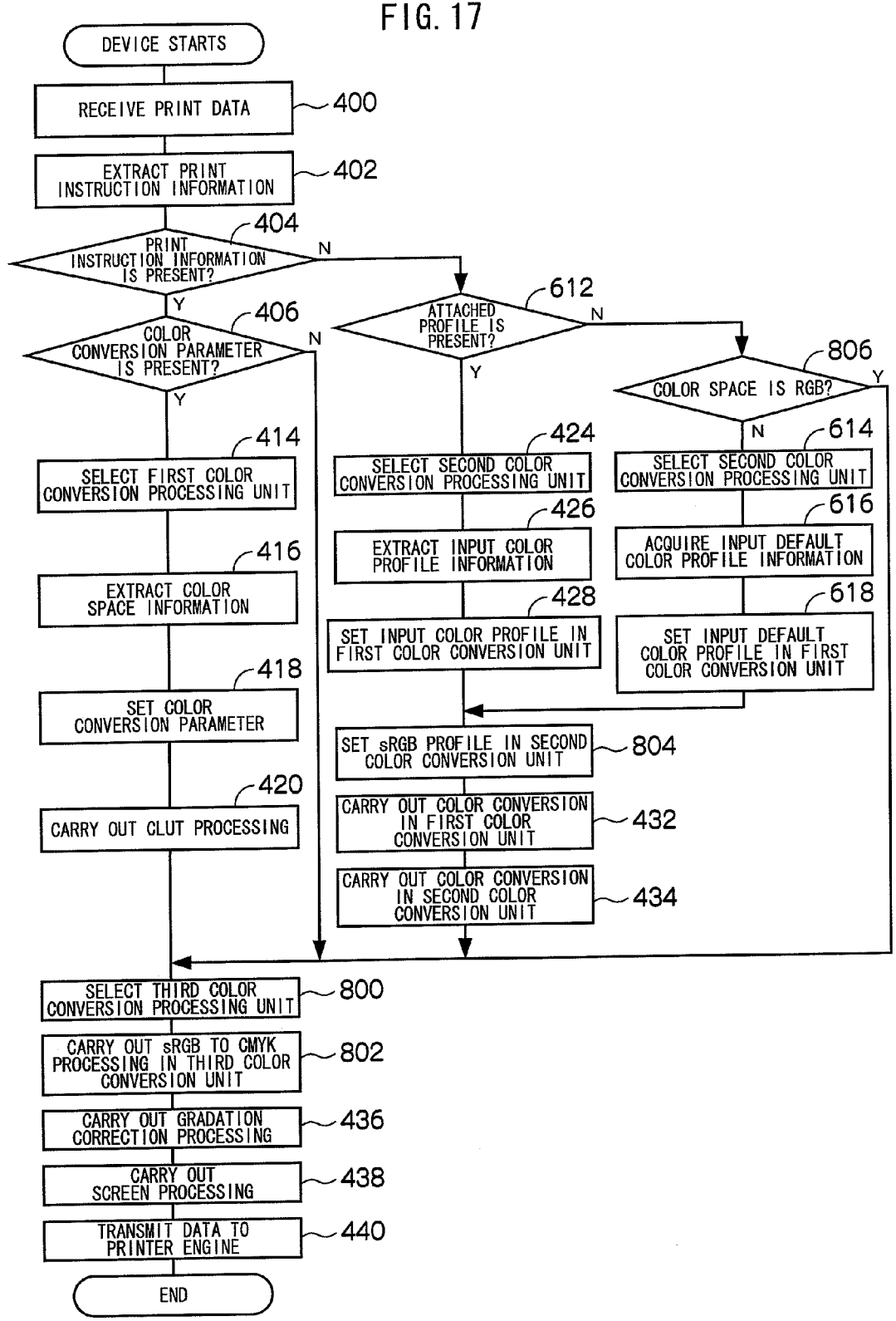
FIG. 17 is a flowchart of processing executed in the device controller of the image output apparatus according to a third exemplary embodiment of the invention.

Next, referring to FIG. 17, the processing executed in the device controller 51" of the image output apparatus 50" is described in detail. FIG. 17 is a flowchart of the processing executed in the device controller 51".

In step 400, the print data 96C is received in the print instruction analyzing unit 80, and in step 402, the print instruction information 6 is extracted from the print data 96C. In next step 404, the presence and absence of the print instruction information 6 is determined.

In step 404, if the print instruction information 6 is present, the determination is affirmative to advance to step 406, in which the presence or absence of the color conversion parameter 8 is determined. If the color conversion parameter 8 is absent in the print data 96C, the image data 4 is determined to have the sRGB color space value, and thus, if the determination is negative, the processing goes to step 800.

In step 800, the third color space conversion processing unit 87" is selected by the color conversion processing selecting unit 82. In next step 802, the third color conversion unit 87" carries out the color gamut conversion processing in which the color space (color gamut) of the image data 4 is converted from the sRGB color space to the CMYK color space, which is an output device color space, and then the processing goes to step 436. After the processing similar to the first exemplary embodiment is performed, the present processing ends.

On the other hand, in step 406, if the color conversion parameter 8 is present, the determination is affirmative to advance to step 414, in which the first color conversion processing unit 84" is selected. In next step 416, the input device color space information is extracted, in step 418, the color conversion parameter 8 is set in the CLUT conversion unit 106", and in step 420, the color space (color gamut) conversion processing of the image data 4 is performed in the CLUT conversion unit 106" to obtain the output image data 130 (sRGB value). The processing then goes to step 800, and after the above-described processing is carried out, the present processing ends.

On the other hand, in step 404, if there is no print instruction information, the determination is negative, and the processing goes to step 612. In step 612, the presence or absence of an attached profile is determined, and for example, if there is an attached profile of an ICC profile or the like, the determination is affirmative to advance to step 424, in which the second color conversion processing unit 86" is selected. In next step 426, the input color profile information is extracted, in step 428, the input color profile is set in the first color conversion unit 124, and the processing goes to step 804. In step 804, the sRGB profile information held in the sRGB profile holding unit 158 is set in the second color conversion unit 126, and then, the processing goes to step 432, in which the color gamut processing from the input device color space to the device-independent color space is carried out in the first color conversion unit 124. In next step 434, the color gamut conversion from the device-independent color space to the sRGB color space is carried out in the second color conversion unit 126, and the processing then goes to step 800. After the above-described processing is carried out, the present processing ends.

On the other hand, in step 612, if there is no attached profile, the determination is negative to advance to step 806. In step 806, if the color space of the image data 4 is the RGB color space, the determination is affirmative to advance to step 800, and after the above-described processing is carried out, and the present processing ends. On the other hand, if the color space is not the RGB, the determination is negative to advance to step 614, and the second color conversion processing unit 86" is selected. In next step 616, the input default color profile held in advance is acquired, and in step 618, after the input default color profile is set in the first color conversion unit 124, and the processing goes to step 804. After the above-described processing is carried out, the present processing ends.

As described above, in the exemplary embodiment, since the color parameter 8 for converting the color space of the image data 4 from the input device color space to the sRGB color space is generated in the color processing unit 72, and the spool image analyzing unit 74 transmits the print data 96C with the generated color conversion parameter 8 written therein, to the print instruction analyzing unit 80 of the device controller 51", the device controller 51" may convert the color space of the image data 4 from the input device color space to the sRGB color space based on the received color conversion parameter 8. This allows the color space of the image data 4 to be converted from the sRGB color space to the CMYK color space based on the CLUT stored in the HDD 58 in advance. Accordingly, the OS 30 supports various types of color spaces, and the input device color space is not limited to one type, but for example, even if each of the image data 4 differs in color space, only generating the color conversion parameter 8 for converting the input device color space to the sRGB color space, writing the same in the print data 96C, and transmitting the same is needed. Moreover, since the color conversion parameter 8 does not depend on the output device color space of the image output apparatus 50", it may correspond to many types and many models of image output apparatuses.

What is claimed is:

1. An image processing apparatus comprising:
a first print information receiving unit that receives first print information, the first print information including image data and color information related to colors of the image data, the color information comprising a color gamut of a color space of the image processing apparatus;
a color conversion parameter generating unit that generates, from an input color profile information included in the color information and an output color profile information, a color conversion parameter for an image output apparatus to convert, based on the color information, color signals of the image data in the color gamut of the color space of the image processing apparatus to color signals of the image data in a color gamut of a color space of the image output apparatus;
a second print information transmitting unit that generates second print information, the second print information comprising the color conversion parameter and the first print information, and transmits the second print information to the image output apparatus for printing an image of the converted color signals of the image data in the color gamut of the color space of the image output apparatus on a recording medium; and
a determination unit that determines, based on the color information received in the first print information receiving unit, whether to generate the color conversion parameter,
wherein if the determination unit determines to generate the color conversion parameter, the color conversion parameter generating unit generates the color conversion parameter, and
wherein if the color conversion parameter generating unit generates the color conversion parameter, the second print information transmitting unit generates the second print information and transmits the second print information to the image output apparatus.

2. The image processing apparatus of claim 1, wherein the color space of the image output apparatus is a CMYK color space.

3. The image processing apparatus of claim 1, wherein the first print information includes image rendering processing information, and the color space of the image processing apparatus is a color space for performing an image rendering processing based on the image rendering process information included in the first print information.

4. The image processing apparatus of claim 3, wherein the image rendering processing is transparency processing.

5. The image processing apparatus of claim 1, wherein the first print information includes image rendering processing information, and the color space of the image processing apparatus is a color space for performing the image rendering processing, based on the image rendering processing information included in the first print information.

6. The image processing apparatus of claim 1, wherein the image output apparatus, in advance, stores an output color conversion parameter for converting a color signal of a predetermined color space to a color signal of a color space of the image output apparatus, and the color space of the image processing apparatus is a color space corresponding to the predetermined color space.

7. The image processing apparatus of claim 1, wherein the image output apparatus, in advance, stores an output color conversion parameter for converting a color signal of a predetermined color space to a color signal of a color space of the image output apparatus, and the color space of the image processing apparatus is a color space corresponding to the predetermined color space.

8. The image processing apparatus of claim 6, wherein the predetermined color space is an sRGB color space.

9. An image output apparatus comprising:
a print information receiving unit that receives, from an image processing apparatus, second print information, the second print information comprising a color conversion parameter and first print information, the color conversion parameter for the image output apparatus to convert color signals of image data in a color gamut of a color space of the image processing apparatus to color signals of the image data in a color gamut of a color space of the image output apparatus, the color conversion parameter generated from an input color profile information included in color information included in the first print information and an from an output color profile information, the first print information including the image data and the color information related to colors of the image data, the color information comprising the color gamut of the color space of the image processing apparatus;
a first color signal conversion unit that, based on the color conversion parameter received in the second print information receiving unit, converts the color signal of the image data in the color space of the image processing apparatus to the color signal of the color space of the image output apparatus,
wherein the image processing apparatus determines, based on the color information, whether to generate the color conversion parameter, generates the color conversion parameter if it is determined to generate the color conversion parameter, and transmits the second print information that is received by the print information receiving unit if the color conversion parameter is generated.

10. The image output apparatus of claim 9, wherein when print information is received from an apparatus other than the image processing apparatus, if color information is included in the print information, the color signal of the image data is converted, based on the color information, to a device-independent color signal and the converted device-independent color signal is converted to the color signal of the color space of the image output apparatus.

11. The image output apparatus of claim 9, wherein the color space of the image output apparatus is a color space for performing an image rendering processing based on the image rendering process information included in the first print information, and
wherein the a first color signal conversion unit converts the color signal of the image data to the color signal of the color space for performing the image rendering process, the conversion carried out based on the color conversion parameter of the second print information.

12. The image output apparatus of claim 11, further comprising a second color signal conversion unit that converts the color signal of the image data that has been converted in the first color signal conversion unit to the color signal of the color space for the image rendering process, to a color signal of the color space of the image output apparatus.

13. The image output apparatus of claim 9, further comprising:
a storage unit that stores an output color conversion parameter for converting a color signal of a predetermined color space to a color signal of a color space of the image output apparatus,
wherein the first color signal conversion unit converts the color signal of the image data to the color signal of the predetermined color space, based on the color conversion parameter of the second print information.

14. The image output apparatus of claim 13, further comprising a second color signal conversion unit that converts, based on the output color conversion parameter, the color signal of the image data, which has been converted in the first color signal conversion unit to the color signal of the predetermined color space, to the color signal of the color space of the image output apparatus.

15. An image processing system comprising:
an image processing apparatus comprising:
a first print information receiving unit that receives first print information, the first print information including image data and color information related to colors of the image data, the color information comprising a color gamut of a color space of the image processing apparatus;
a color conversion parameter generating unit that generates, from an input color profile information included in the color information and an output color profile information, a color conversion parameter for an image output apparatus to convert, based on the color information, color signals of the image data in the color gamut of the color space of the image processing apparatus to color signals of the image data in a color gamut of a color space of the image output apparatus;
a second print information transmitting unit that generates second print information, the second print information comprising the color conversion parameter and the first print information, and transmits the second print information to the image output apparatus for printing an image, based on the image data in the color space of the image processing apparatus, in the color gamut of the color space of the image output apparatus on a recording medium; and
a determination unit that determines, based on the color information received in the first print information receiving unit, whether to generate the color conversion parameter,
wherein if the determination unit determines to generate the color conversion parameter, the color conversion parameter generating unit generates the color conversion parameter, and
wherein if the color conversion parameter generating unit generates the color conversion parameter, the second print information transmitting unit generates the second print information and transmits the second print information to the image output apparatus; and
the image output apparatus comprising:
a second print information receiving unit that receives the second print information transmitted from the image processing apparatus;
a color signal conversion unit that, based on the color conversion parameter received in the second print information receiving unit, converts the color signal of the image data in the color space of the image processing apparatus to the color signal in the color gamut of the color space of the image output apparatus.

16. A recording medium storing an image processing program that causes a computer to execute processing, the processing comprising:
receiving first print information, the first print information including image data and color information of colors of the image data, the color information comprising a color gamut of a color space of the image processing apparatus;
determining, based on the color information, whether to generate a color conversion parameter;
generating, if it is determined to generate the color conversion parameter, from an input color profile information included in the color information and an output color profile information, the color conversion parameter for an image output apparatus to convert, based on the color information included, color signals of the image data in the color gamut of the color space of the image processing apparatus to color signals of the image data in a color gamut of a color space of the image output apparatus; and
generating second print information, the second print information comprising the color conversion parameter and the first print information; and
transmitting, if the color conversion parameter is generated, the second print information to the image output apparatus for printing an image, based on the image data in the color space of the image processing apparatus, in the color gamut of the color space of the image output apparatus on an output recording medium.

17. A recording medium storing an image output program that causes a computer to execute processing, the processing comprising:
receiving second print information from an image processing apparatus, the second print information comprising a color conversion parameter and first print information, the color conversion parameter for an image output apparatus to convert color signals of image data in a color gamut of a color space of the image processing apparatus to color signals of the image data in a color gamut of a color space of the image output apparatus, the color conversion parameter generated from an input color profile information included in color information included in the first print information and an from an output color profile information, the first print information including the image data and the color information related to colors of the image data, the color information comprising the color gamut of the color space of the image processing apparatus; and
converting, based on the color conversion parameter, a color signal of the image data in the color space of the image processing apparatus to a color signal of the color space fixed in advance,
wherein the image processing apparatus determines, based on the color information, whether to generate the color conversion parameter, generates the color conversion parameter if it is determined to generate the color conversion parameter, and transmits the second print information that is received by the print information receiving unit if the color conversion parameter is generated.

18. An image processing method comprising:
receiving first print information, the first print information including image data and color information of colors of the image data, the color information comprising a color gamut of a color space of the image processing apparatus;
determining, based on the color information, whether to generate a color conversion parameter;
generating, if it is determined to generate the color conversion parameter, from an input color profile information included in the color information and an output color profile information, the color conversion parameter for an image output apparatus to convert, based on the color information included, color signals of the image data in the color gamut of the color space of the image processing apparatus to color signals of the image data in a color gamut of a color space of the image output apparatus; and
generating second print information, the second print information comprising the color conversion parameter and the first print information; and
transmitting, if the color conversion parameter is generated, the second print information to the image output apparatus for printing an image, based on the image data in the color space of the image processing apparatus, in the color gamut of the color space of the image output apparatus on an output recording medium.

* * * * *